(12) United States Patent
Leonhardt et al.

(10) Patent No.: US 12,260,729 B2
(45) Date of Patent: Mar. 25, 2025

(54) WEARABLE MONITORING DEVICES, SYSTEMS AND METHODS

(71) Applicant: Futurisks, LLC, Macclesfield, NC (US)

(72) Inventors: Gary Leonhardt, Macclesfield, NC (US); Jon Buttram, Raleigh, NC (US); Akash Ganapathi, Apex, NC (US); Peter Seymour, Greenville, NC (US); Timothy Masterbone, Mine Hill, NJ (US)

(73) Assignee: Futurisks, LLC, Macclesfield, NC (US)

( * ) Notice: Subject to any disclaimer, the term of this patent is extended or adjusted under 35 U.S.C. 154(b) by 222 days.

(21) Appl. No.: 18/051,326

(22) Filed: Oct. 31, 2022

(65) Prior Publication Data

US 2023/0098445 A1   Mar. 30, 2023

Related U.S. Application Data

(63) Continuation-in-part of application No. 17/337,353, filed on Jun. 2, 2021, now Pat. No. 11,747,857.

(Continued)

(51) Int. Cl.
*G06F 1/16* (2006.01)
*G08B 21/02* (2006.01)
(Continued)

(52) U.S. Cl.
CPC ......... *G08B 21/0288* (2013.01); *G06F 1/163* (2013.01); *G08B 21/0266* (2013.01);
(Continued)

(58) Field of Classification Search
CPC ...... G06F 1/163; G06F 1/1626; G06F 1/1633; G06F 1/1652; G06F 1/1654;
(Continued)

(56) References Cited

U.S. PATENT DOCUMENTS

| | | | |
|---|---|---|---|
| 4,284,849 A | 8/1981 | Anderson et al. | |
| 4,918,717 A | 4/1990 | Bissonnette et al. | |

(Continued)

FOREIGN PATENT DOCUMENTS

| | | |
|---|---|---|
| CA | 2728834 C | 12/2009 |
| CA | 2831996 C | 10/2012 |

(Continued)

OTHER PUBLICATIONS

Delahoz et al., "Survey on Fall Detection and Fall Prevention Using Wearable and External Sensors", Sensors, 2014, vol. 14, pp. 19806-19842.

(Continued)

*Primary Examiner* — Anthony M Haughton
(74) *Attorney, Agent, or Firm* — Michael Best & Friedrich LLP

(57) ABSTRACT

A wearable monitoring device for securely remaining coupled to a user and recording data pertaining to the user is provided. The device includes a main body, which has a display for viewing, a magnet for aligning the main body to other objects, a rechargeable battery for powering the main body and a computing module for storing, transferring and analyzing data. The device also includes a band extending from a first end of the main body to a second end of the main body for permitting coupling of the device to a user. The band may include anti-tampering features for preventing uncoupling of the device from a user without detection.

21 Claims, 15 Drawing Sheets

Related U.S. Application Data

(60) Provisional application No. 63/033,213, filed on Jun. 2, 2020, provisional application No. 63/033,211, filed on Jun. 2, 2020.

(51) Int. Cl.
   *H04W 4/029*   (2018.01)
   *H04W 4/80*    (2018.01)
   *H05K 5/00*    (2006.01)
   *H05K 7/00*    (2006.01)

(52) U.S. Cl.
   CPC ........ *G08B 21/0269* (2013.01); *H04W 4/029* (2018.02); *H04W 4/80* (2018.02)

(58) Field of Classification Search
   CPC ............ G08B 21/0288; G08B 21/0266; G08B 21/0269; H04W 4/029; H04W 4/80
   See application file for complete search history.

(56) References Cited

U.S. PATENT DOCUMENTS

| | | | |
|---|---|---|---|
| 5,027,383 | A | 7/1991 | Sheffer |
| 5,195,126 | A | 3/1993 | Carrier et al. |
| 5,225,997 | A | 7/1993 | Lederer et al. |
| 5,305,370 | A | 4/1994 | Kearns et al. |
| 5,479,482 | A | 12/1995 | Grimes |
| 5,673,304 | A | 9/1997 | Conner et al. |
| 5,923,731 | A | 7/1999 | McClure |
| 6,049,272 | A | 4/2000 | Lee et al. |
| 7,633,263 | B2 | 12/2009 | Toya |
| 8,059,105 | B2 | 11/2011 | Rosenberg et al. |
| 8,116,724 | B2 | 2/2012 | Peabody |
| 8,351,299 | B2 | 1/2013 | Cohen et al. |
| 8,441,353 | B2 | 5/2013 | Williams, Sr. et al. |
| 8,466,794 | B2 | 6/2013 | Mack et al. |
| 8,638,301 | B2 | 1/2014 | Birnbaum et al. |
| 8,684,922 | B2 | 4/2014 | Tran |
| 8,933,803 | B2 | 1/2015 | Sharma et al. |
| 9,462,135 | B2 | 10/2016 | Smith et al. |
| 9,553,616 | B2 | 1/2017 | McCormack et al. |
| 9,900,669 | B2 | 2/2018 | Touma et al. |
| 9,990,831 | B2 | 6/2018 | Keyton |
| 10,109,173 | B2 | 10/2018 | Keyton |
| 10,255,789 | B2 | 4/2019 | Keyton |
| 10,455,085 | B1 | 10/2019 | Roundy et al. |
| 10,474,192 | B2 | 11/2019 | Song et al. |
| 10,515,536 | B2 | 12/2019 | Grundstrom |
| 10,546,657 | B2 | 1/2020 | Leonhardt et al. |
| 10,849,392 | B1 | 12/2020 | Wittenberg et al. |
| 2007/0082651 | A1 | 4/2007 | Loizeaux |
| 2009/0319230 | A1 | 12/2009 | Case, Jr. et al. |
| 2011/0181418 | A1 | 7/2011 | Mack et al. |
| 2011/0245633 | A1 | 10/2011 | Goldberg et al. |
| 2013/0148790 | A1 | 6/2013 | McGary et al. |
| 2014/0218184 | A1* | 8/2014 | Grant ...................... G06F 3/016 340/407.1 |
| 2014/0329491 | A1 | 11/2014 | Scott |
| 2015/0185764 | A1 | 7/2015 | Magi |
| 2016/0041581 | A1* | 2/2016 | Piccionelli ........ G02F 1/133305 345/156 |
| 2016/0058133 | A1* | 3/2016 | Fournier ............ A61B 5/02141 63/3.1 |
| 2016/0179198 | A1* | 6/2016 | Levesque ................ G06F 1/163 340/407.1 |
| 2018/0013947 | A1 | 1/2018 | Kim |
| 2020/0000351 | A1 | 1/2020 | Rauhala |
| 2022/0361810 | A1* | 11/2022 | Price .................... A61B 5/7405 |
| 2023/0161470 | A1* | 5/2023 | Crowley ................ G06F 1/163 715/771 |
| 2023/0359320 | A1* | 11/2023 | Huang .................. G06F 1/1654 |
| 2023/0359422 | A1* | 11/2023 | Anderson ............ G06V 40/174 |
| 2023/0400958 | A1* | 12/2023 | Morrison ........... G02B 27/0179 |

FOREIGN PATENT DOCUMENTS

| | | | |
|---|---|---|---|
| CN | 102982653 | A | 3/2013 |
| EP | 0738065 | A1 | 10/1996 |
| KR | 20170140962 | A | 12/2017 |
| WO | 2008116284 | A1 | 10/2008 |
| WO | 2015019360 | A1 | 2/2015 |
| WO | 2016110804 | A1 | 7/2016 |
| WO | 2019143106 | A1 | 7/2019 |

OTHER PUBLICATIONS

HospiMedica, "Innovative Smartband Predicts Pending Epileptic Seizures", <https://www.hospimedica.com/health-it/articles/294776586/innovative-smartband-predicts-pending-epileptic-seizures.html>, Jan. 2019, 5 pages.

Pyzyk, "Tech can impact domestic violence—not always in a positive way", SmartcitiesDive, <https://www.smartcitiesdive.com/news/tech-can-impact-domestic-violence-not-always-in-a-positive-way/555757/>, May 2019, 8 pages.

Ren et al., "High-performance wearable thermoelectric generator with self-healing, recycling, and Lego-like reconfiguring capabilities", Science Advances, 2021, vol. 7, pp. 1-8.

Yang et al., "A Review of Accelerometry-Based Wearable Motion Detectors for Physical Activity Monitoring", Sensors, 2010, vol. 10, pp. 7772-7788.

AliExpress, "New 4 in 1 Emergecy Power Bank Lighter BRacelet Charger Cable for iPhone 5 5S 6 Plus Samsung / HTC / Sony / Moto / LG / Nokia", <https://ar.aliexpress.com/item/2251832333105599.html?gatewayAdapt=4itemAdapt>, available online at least prior to Jun. 2020, 17 pages.

* cited by examiner

WEARABLE MONITORING DEVICES, SYSTEMS AND METHODS

RELATED APPLICATIONS

The presently disclosed subject matter is a continuation-in-part patent application of U.S. patent application Ser. No. 17/337,353, filed Jun. 2, 2021, which claims the benefit of U.S. Provisional Patent Application Ser. No. 63/033,211, filed Jun. 2, 2020, and U.S. Provisional Patent Application Ser. No. 63/033,213, also filed Jun. 2, 2020. The disclosures of these patent applications are incorporated herein by reference in their entireties.

TECHNICAL FIELD

The presently disclosed subject matter is directed towards wearable safety devices that can be worn by people to allow for monitoring and communication to provide protection against abuse and/or abduction. Specifically, such a device may include data collection capabilities, remote communications capabilities, and anti-tampering security features for assisting a user and/or the monitoring entity by ensuring placement and use of the device, allowing identification and tracking of location of the user and device, and allowing communication between the user and monitoring entity if need be.

BACKGROUND

Violence and domestic abuse are a pervasive problem. Protecting victims from future abuse requires innovative solutions. There have been a number of software applications and other digital solutions that have focused on passing along helpful information and resources to victims. Further, a number of wearable devices have been developed permitting a victim to manually signal for assistance when confronted by an abuser or potential threat. While these innovations are useful, they require action by the victim, who may be disinclined to act, or may be prevented from acting. It is well known that victims of domestic violence are often deterred from taking action by their abuser, whether from fear, manipulation or physical detainment. Accordingly, there remains a need for a device, system and method of use that addresses the various disadvantages associated with currently victim-assisting technology as well as abuser monitoring technology. Specifically, secure and automatic detection of threats and harm should be made available to victims so that assistance cannot be prevented by the abuser.

Additionally, child safety is another societal concern that continues to grow. With many single parent families and families where both parents need to work, children are often left alone. Nany cams and other similar monitoring systems can provide some level of comfort and security to parents but only if the child and/or the person watching the child are within the space being monitored. For children of a certain age, smart phones and smart watches can be used to provide some level of monitoring. This level of monitoring only works if the child is of an age to have such devices. Additionally, the level of monitoring is dependent upon the child having the device with them. The child has to be responsible enough to have the device with them. Also, there is a concern that that the child may intentionally or unintentionally not have the smart phone or smart watch with them. Having a way to monitoring the children and their whereabouts without fear of a monitoring device not being with the child remains a concern.

Devices to be worn on the body are becoming ubiquitous. These devices require power to function and charging the devices typically requires removing the device or for the user to remain stationary while the device is being worn. For many users, the temporary functional unavailability, the repeated removing/reattachment wears down both the device and patience of the user, as well as risks the device being lost. There have been a number of innovative solutions that have focused on charging a device while being worn, but they typically obstruct the user's full use of their hands, feet or body. Accordingly, there remains a need for a charger, system and method of use that addresses the various disadvantages associated with current devices being worn and the methods for charging them. Specifically, a charger which can charge a device while being worn, without inconveniencing the wearer is herein provided. The charge may be used to ensure the victim's device described herein remains charged while being worn by the victim.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

According to at least one embodiment of the disclosed subject matter, a wearable monitoring device is provided. The monitoring device can comprise a main body defining a first end opposite a second end, an interior surface opposite an exterior surface and both extending between the first end and the second end and a display positioned on the exterior surface. The monitoring device can also comprise at least one magnet positioned on a side surface extending between the first end, the second end, the interior surface and the exterior surface, and at least one battery positioned proximal the at least one magnet and housed within the main body. The monitoring device can additionally comprise a computing module housed within the main body, wherein the computing module includes a processor and memory. Further, the monitoring device can comprise a band configured to extend from the first end to the second end for defining a void between the interior surface and the band. In some embodiments, the monitoring device can comprise a durable securement cable housed within the band to delay a rapid cutting attempt. In some embodiments, the monitoring device can comprise a fiber optic cable housed within the band that can extend along the length of the band with a light source, such as a n emitter, transmitter, or transceiver on one end and a light receiving sensor, such as a receiver or a detector on the other end. If the fiber optic cable is damaged, the receiver can detect it and the monitoring device can silently report an attempt to remove the device, such as a cutting attempt. For example, the monitoring device can be designed to alert designated authority entities when there is a loss of light in the receiving sensor. In some embodiments, the monitoring device can comprise delicate breakable metal circuitry housed within the band and extending across the length of the band. The delicate breakable metal circuitry can be connected to a transmitter or transceiver of an electric circuit on one end and a receiver/sensor of an electric circuit on the other end. The delicate breakable metal circuitry can be designed such that the electric circuit can alert designated authority entities when there are shearing forces damage the delicate breakable metal circuitry breaking the electric flow leading to a circuit break with loss of electrical flow to the receiving sensor.

According to at least another embodiment of the disclosed subject matter, a wearable charger is provided. The charger includes a main body defining a first end opposite a second end, an interior surface opposite an exterior surface and both extending between the first end and the second end, and one or more side surfaces extending between the first end, the second end, the interior surface and the exterior surface; a display positioned on one of the surface of the main body; at least one magnet positioned on one of the surfaces of the main body; at least one battery positioned within the main body; a male band extending from the first end; a female band extending from the second end for selectively engaging with the male band or a flexible open-ended band with return shape memory allowing for quick and easy attachment and/or removal.

BRIEF DESCRIPTION OF THE DRAWINGS

The foregoing, as well as the following Detailed Description of preferred embodiments, is better understood when read in conjunction with the drawings included herein. For the purposes of illustration, there is shown in the drawings exemplary embodiments; however, the presently disclosed subject matter is not limited to the specific methods and instrumentalities disclosed.

DETAILED DESCRIPTION

Figure 1A:
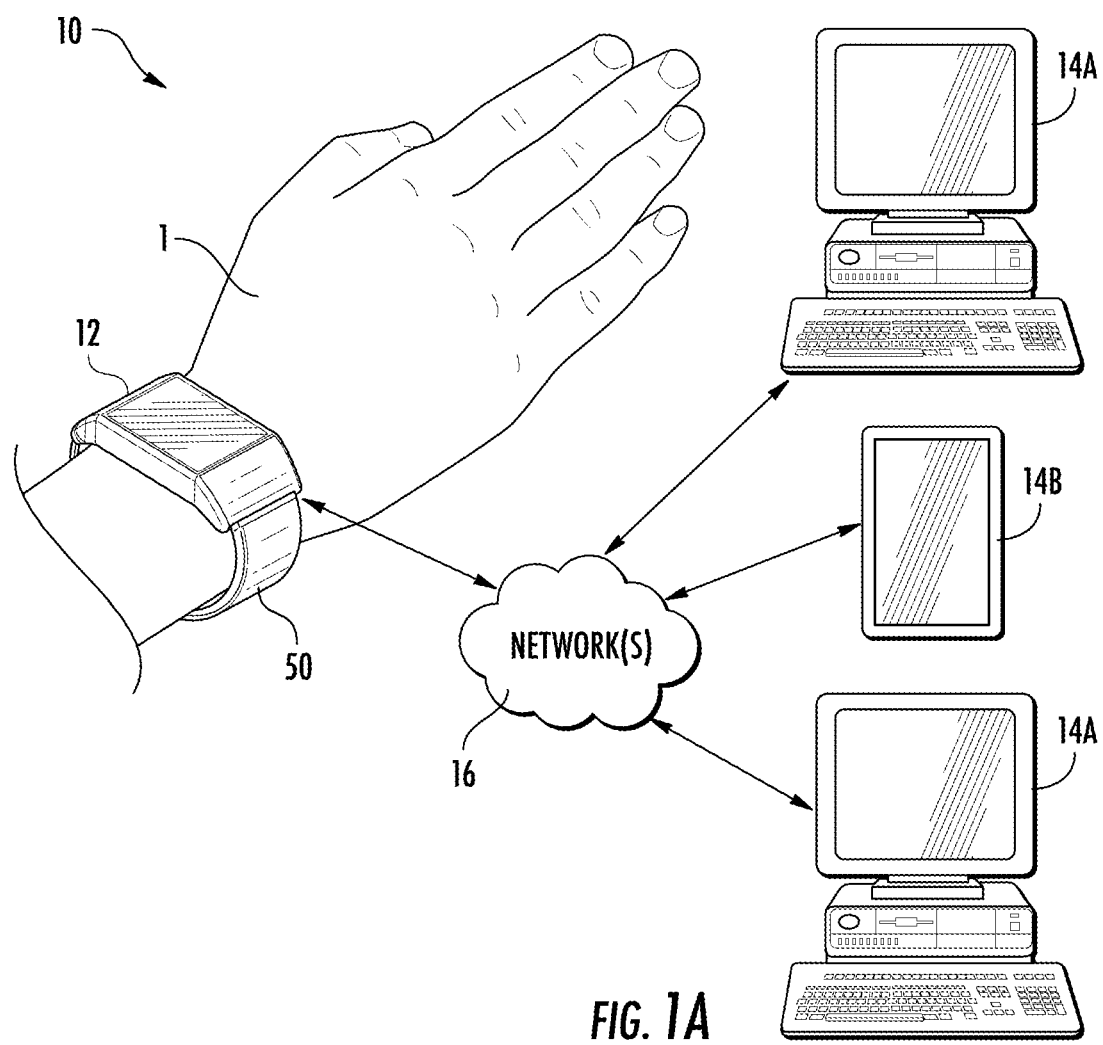
FIG. 1A illustrates an example communication environment according to example embodiments of the monitoring systems and methods that employ embodiments of monitoring devices according to the present subject matter.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Thus, embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer, or section from another feature, element, component, region, layer, or section. Thus, a first feature, element, component, region, layer, or section discussed below could be termed a second feature, element, component, region, layer, or section without departing from the teachings of the disclosure herein "Computers" or "computing device(s)," as used herein means one or more desktop computers, laptop computers, set-top devices, tablet computers, mobile devices, mobile smart devices, smartphones, wearable devices, servers, microcontroller, a device employing a central processing unit, and/or the like and includes, but is not limited to any mobile electronic device configured with imaging and/or computing capabilities. Such computing devices can include, but are not limited to, at least one of a mobile smartphone, a personal digital assistant (PDA), a computing tablet, a personal media player, a wearable computing device, such as a smartwatch or smart bracelet, or any like mobile electronic device configured with imaging and/or computing capabilities. In some embodiments, the computing device may be provisioned with a hardware-based processor that is configured to execute software programs or applications.

It is to be understood that the ranges and limits mentioned herein include all ranges located within the prescribed limits (i.e., subranges). For instance, a range from about 0.1 of a mile to about 5 miles also includes ranges from about one mile to about 4 miles, about 1,000 feet to about 3 miles, 1.2 miles to 2.8 miles, and about 0.9 miles to about 1.8 miles. Further, a limit of up to about 2 miles also includes a limit of up to about 0.5 miles, up to about 1 mile, and up to about 1.4 miles, as well as ranges within the limit, such as from about 0.1 of a mile to about 2 miles, and from about 1.1 miles to about 1.5 miles.

Referring to FIG. 1A, a security system 10 of the present invention may include a wearable monitoring device 12 that can be worn by a user 1 and one or more remote computing devices 14A, 14B, 14C. For example, the one or more computing devices 14A, 14B, 14C can be any computing device that can process and monitor information shared by the monitoring device 12 via one or more networks 16. For example, the one or more computing devices can be a desk top computer 14A, a mobile smart device 14B, such as a tablet or smart phone, or a mainframe computer 14C. In some embodiments, the monitoring device 12 can communicate wireless via a mobile network, Wi-Fi network, or a combination thereof, with one remote computing device or multiple remote computing devices as shown. The device 12 and one or more remote computing devices 14A, 14B, 14C may be configured to communicate with each other using any known communication methods. The device 12 may be worn by a user 1 for detecting conditions for storage and/or analyzation by the device 12 and/or computer 14.

Depending on the intended purpose of the monitoring device 12, the monitoring device can monitor different actions and environmental conditions. For example, for embodiments used to monitor abusive perpetrators, the device 12 may detect a violent act, undesirable tampering of the device 12, a voice command, or a gunshot and communicate such condition to the one or more remote computing devices 14A, 14B, 14C for subsequent action, such as alerting authorities or checking in with the user or a likely victim. The system may further include a charging system to keep the monitoring device 12 charged, as described in U.S. patent application Ser. No. 17/337,353, filed Jun. 2, 2021, which is incorporated by reference herein as described above.

Figure 1B:
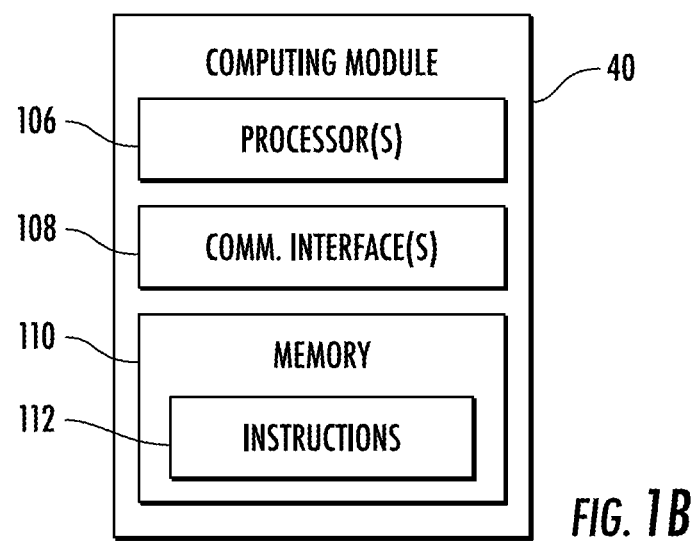
FIG. 1B illustrates a schematic view of an embodiment of a computing module within an embodiment of a monitoring device according to one or more embodiments of the presently disclosed subject matter.

Referring to FIG. 1B, a schematic of an example of a computing module 40 of the monitoring device 12 used to operate the monitoring device 12. The computing module 40 may include one or more processor(s) 106, one or more communication interfaces 108, and memory 110 (e.g., one or more hardware components for storing executable instructions, data, and/or the like). Communication interface(s) 108 may enable monitoring device 12 to communicate with one or more remote computing devices 14A, 14B, 14C (e.g., via network(s) 16 or the like). Memory 110 may include (e.g., store, and/or the like) instructions 112. When executed by processor(s) 106, instructions 112 may cause monitoring device 12 to perform one or more operations, functions, and/or the like described herein.

Figure 1C:
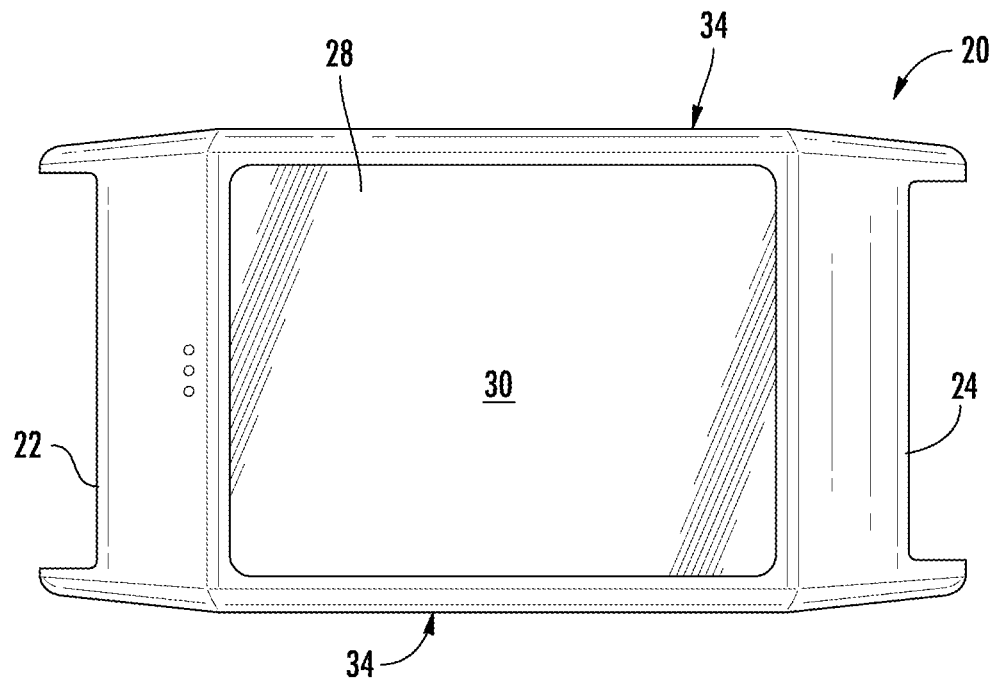
FIG. 1C illustrates a top view of an embodiment of a display of a main body of a monitoring device according to one or more embodiments of the presently disclosed subject matter.
Figure 2:
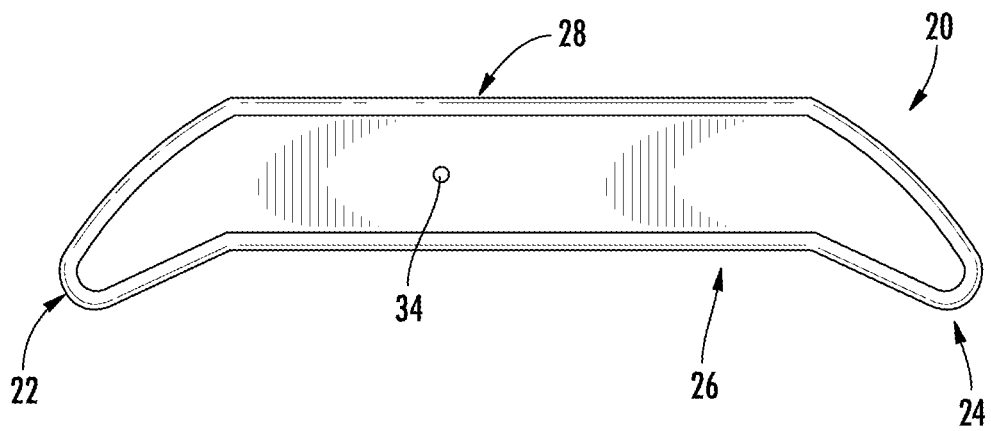
FIG. 2 illustrates a side view of the main body of a monitoring device according to one or more embodiments of the presently disclosed subject matter.

FIGS. 1C and 2 depict a shape and configuration of the main body 20 according to some embodiments without the band 50 that is used to secure the monitoring device 12 to the user 1 as shown in FIG. 1A. In some embodiments, the device 12 can include a main body 20 coupled to a band 50. The main body 20 may define a first end 22 opposite a second end 24, an interior surface 26 opposite an exterior surface 28. The surfaces 26, 28 can extend between the first end 22 and the second end 24. Further, the main body 20 may define at least one side 34 extending between the two ends 22, 24 and the two surfaces 26, 28.

The main body 20 may include a display 30 for displaying information. The display 30 may also include one or more inputs for receiving commands from the user 1. The input(s) may be a button, haptic surface, or some other tactile feature. The display 30 may be positioned at the exterior surface 28 for viewing by the user as shown in FIG. 1C.

Figure 3:
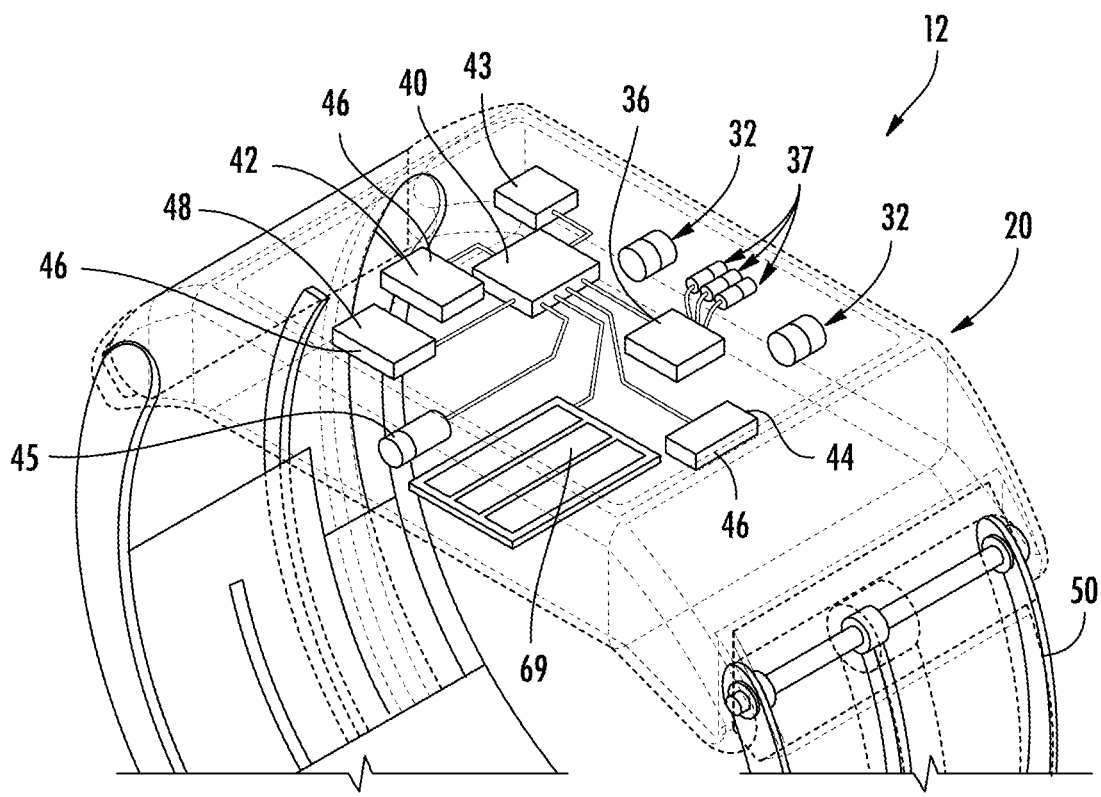
FIG. 3 illustrates a perspective view of an interior schematic of the main body of a monitoring device having magnets, pins and a computer module according to one or more embodiments of the presently disclosed subject matter.
Figure 7:
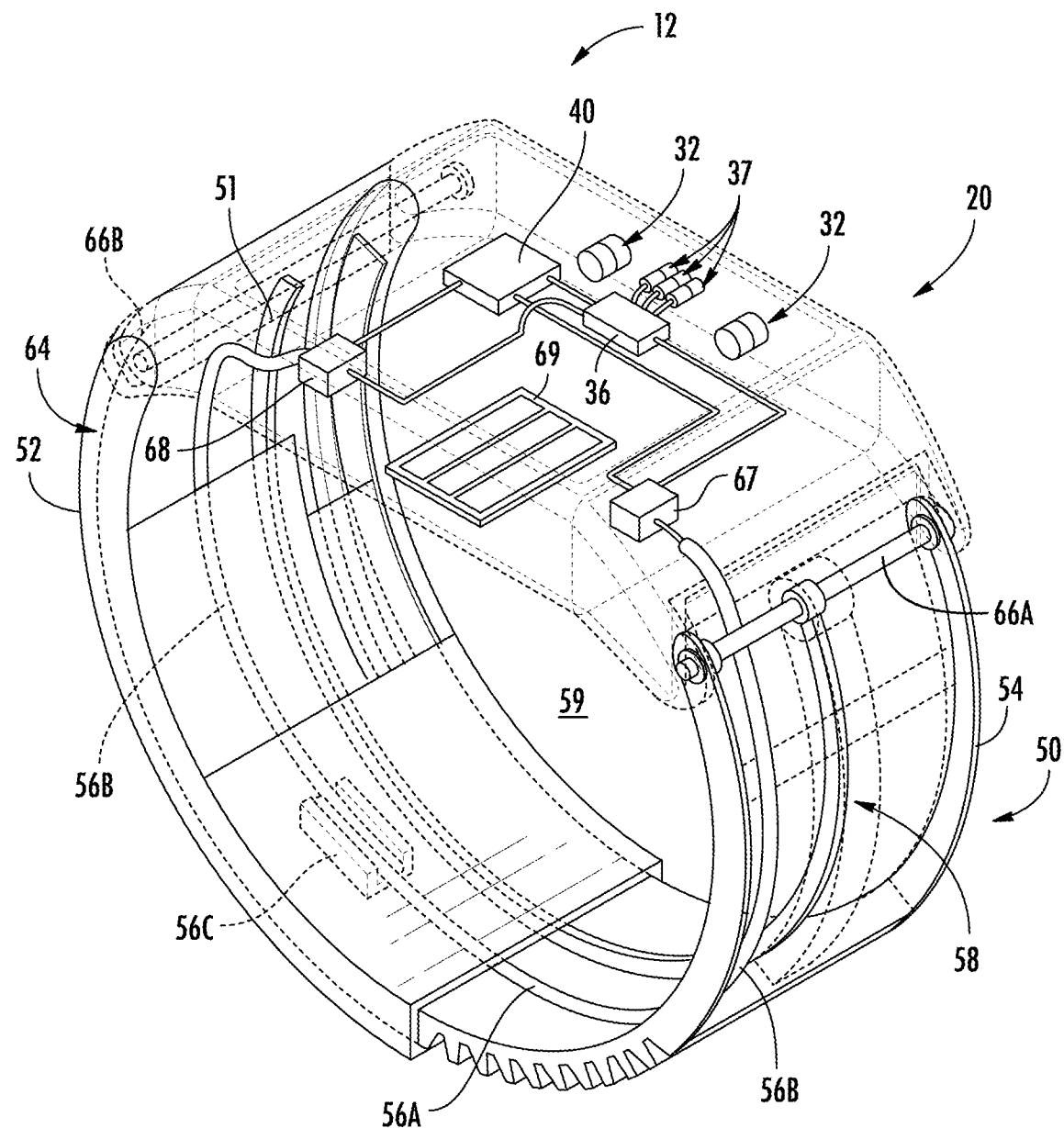
FIG. 7 illustrates a perspective view of an interior schematic of a monitoring device according to one or more embodiments of the presently disclosed subject matter.

Turning to FIGS. 3 and 7, the main body 20 may house a number of components, such as one or more sensors for sensing conditions. Sensors 46 of the device 12 may include one or more of any of the following: accelerometer 48 for sensing motion or acceleration (e.g., a piezoelectric accelerometer), a microphone 45 for sensing audio, a pressure sensor 44 or piezoelectric crystals for sensing pressure, a location sensor 42 (which may be a GPS transmitter), or any other sensor configured to detect a condition of the user or the environment in which the user is located. In some embodiments, the microphone 45 may capture audio sensed conditions and the computer module 40 and/or the one or more remote computing devices 14A, 14B, 14C may perform analytics on the audio to identify gunshots, verbal threats or other notable audio events. Noise cancellation functions can be applied to the audio once captured or may be applied to the initial capture of sensed conditions through the microphone components itself. The sensors 46 of the device 12 may detect vibration and/or acceleration using an accelerometer 48 or other sensors 46. The sensed conditions may be analyzed to identify punches or defense of punches or other violent acts.

Alternatively, if the monitoring device is used to track the well-being of a child, the sensed conditions that the sensors 46 track may be the child's actual location relative to a tagged location where they are supposed to be. Similarly, the sensed condition may be sensing whether someone is trying to remove the monitoring from the child, be it the child or someone else.

The main body 20 may further house a battery 36 for powering the display 30, sensor(s) 46, and/or a computing module 40 and can include wireless communication device 43 for wirelessly transmitting and receiving communications to and from the one or more remote computing devices 14A, 14B, 14C. The battery 36 may be rechargeable and may be charged wirelessly or by using an electrical connection. The main body 20 may include one or more connection pins (or ports) 37 for charging the battery 36 and/or permitting data transfers through an electrical connection, such as software updates or installations, as well as stored conditions, analytics and other data. The port 37 may be a Universal Serial Bus (USB) port, such as USB-C. The pin(s) or port(s) 37 may be in electrical communication with the battery 36. In some embodiments, the battery 36 may include one or more coils for receiving a wireless energy transfer as described in U.S. patent application Ser. No. 17/337,353, filed Jun. 2, 2021, which is incorporated by reference herein as described above. The wireless energy transfer may be received from a charging system.

Figure 10:
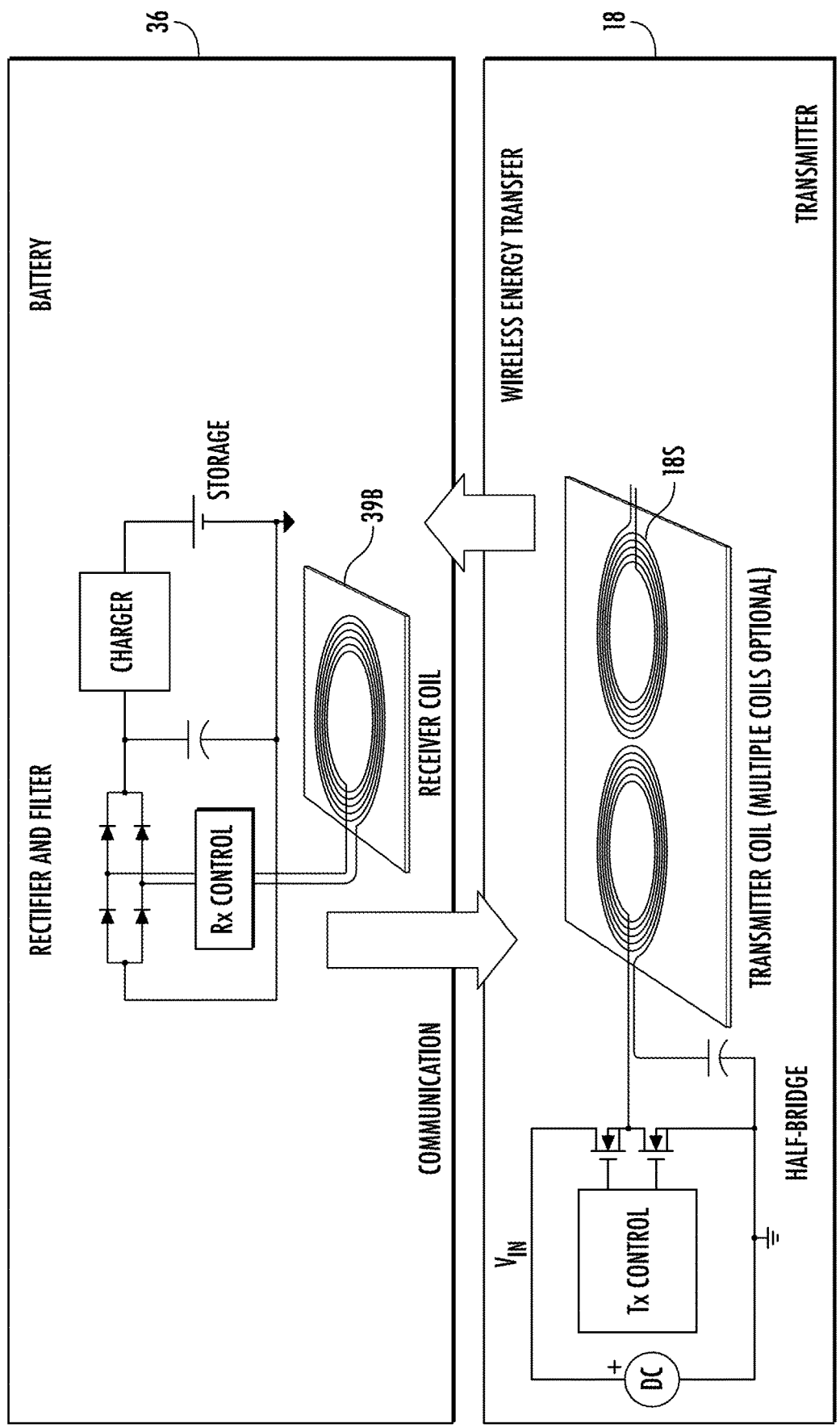
FIG. 10 illustrates a schematic of a battery and transmitter according to one or more embodiments of the presently disclosed subject matter.
Figure 11:
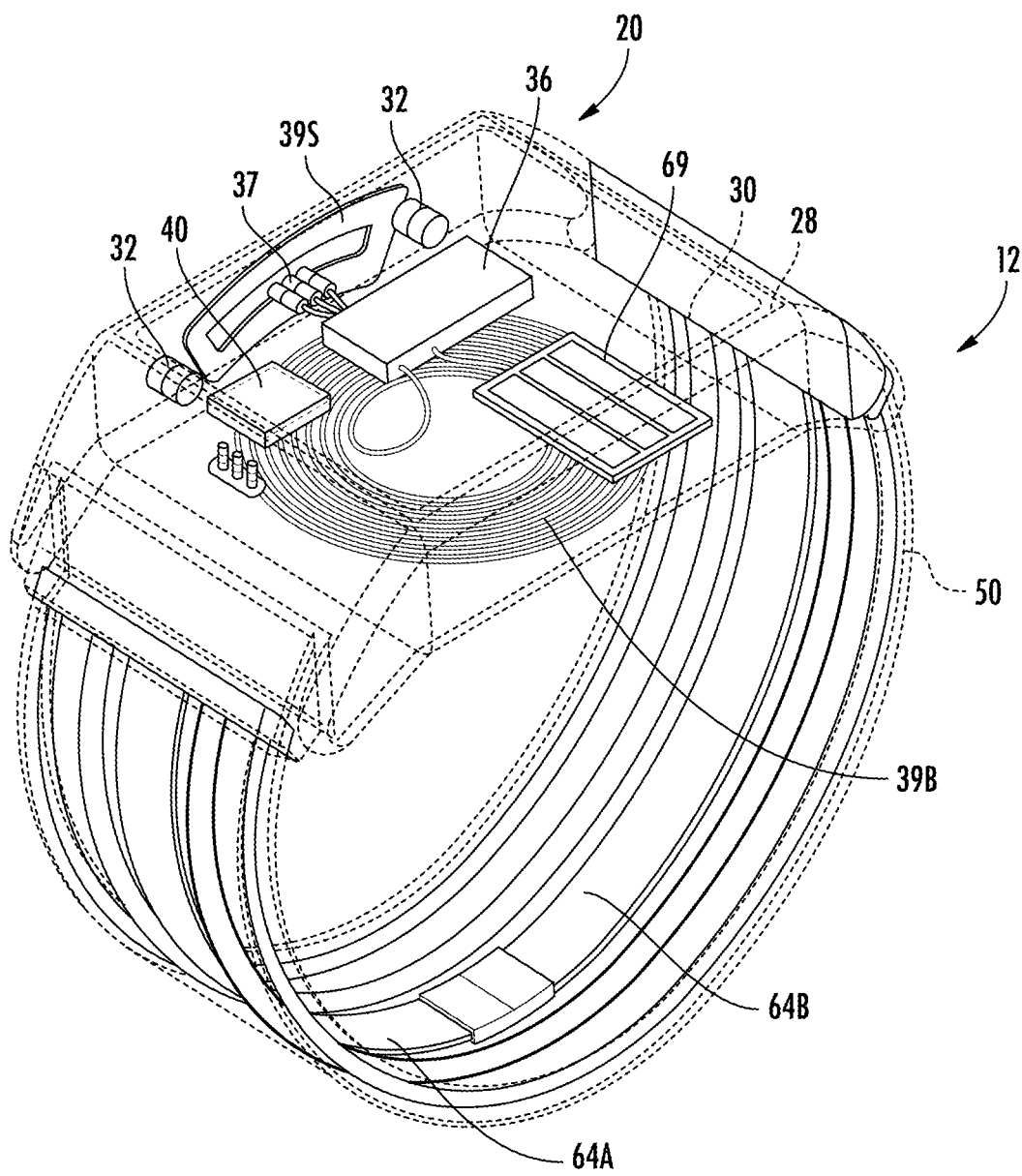
FIG. 11 illustrates a perspective view of a portion of an interior schematic of a monitoring device according to one or more embodiments of the presently disclosed subject matter.
Figure 12:
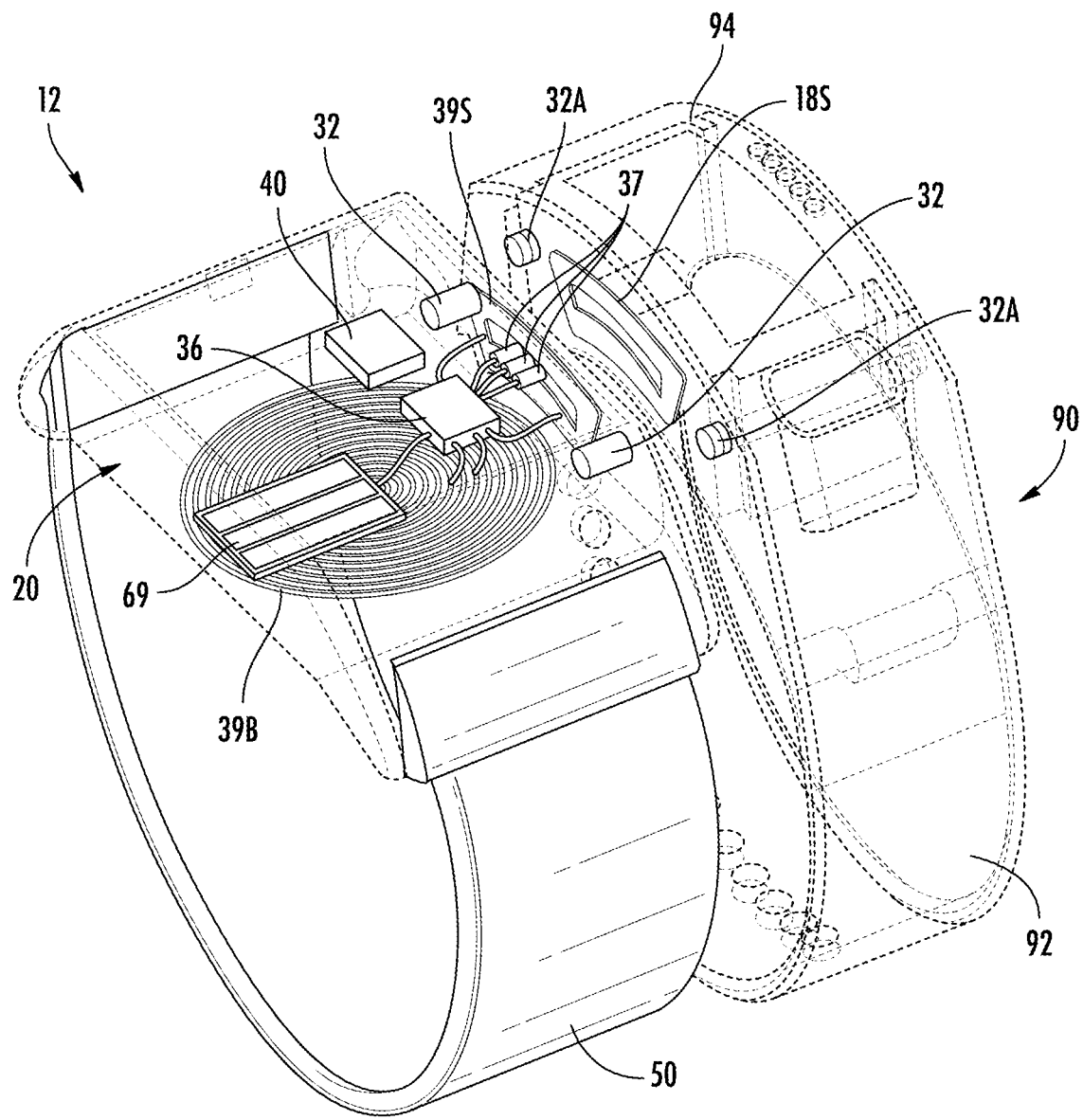
FIG. 12 illustrates a perspective view of a portion of an interior schematic of a monitoring device and a portion of an interior schematic of a charger battery band according to one or more embodiments of the presently disclosed subject matter.

According to some embodiments as shown in FIGS. 3, 7, and 10-12, the monitoring device 12 can further include at least one magnet 32 for aligning the device 12 with a transmitter 18S (the transmitter 18 being a device or connection between devices configured to transmit power to the battery 36 and/or communicate with the device 12 for the exchange of data). One or more transmitters 18B, 18S may be included in the charging system and may be alignable with transceiver coils 39B, 39S respectively, to receiving and transmit power and communications. The at least one magnet 32 may be positioned on the side surface 34. In some embodiments, at least two magnets 32 may be positioned along the same side surface 34, and a coil 39S may be positioned between the two of the at least two magnets 32 as seen in FIGS. 11 and 12. As shown in FIG. 12, a battery band 90 can be provided to permit the charging of the monitoring device 12 while the monitoring device 12 is on the wrist of the wearer without having to remove the monitoring device 12. The battery band can comprise main body 94 that can house one or more battery cells and a band 92 connected to either side of the main body 94 to allow the battery band to be held to the arm of the wearer when the battery band is linked to the monitoring device 12 to charge the monitoring device 12. The battery band 90 can comprise a transmitter 18S that may include correspondingly positioned magnets, thereby allowing the coil 39S of the device 12 and the transmitter 18S to align for effective communication. For example, such a configuration may permit the transmitter coil of the transmitter 18S to align with the receiver coil 39S of the battery 36. In another example, where the main body 20 further includes pins 37 for electrical communication, the magnet(s) 32 of the device 12 may permit alignment with the transmitter 18S for aligning the pins 37 with corresponding electrical connections of the transmitter 18S.

According to some embodiments as shown in FIG. 10, the main body 20 may define a male or female shape along the side surface 34 for corresponding to, and nestingly engaging with, a complementary female or male shape of the transmitter 18S of the battery band 90. In such embodiments, only one magnet 32 may be included by the main body 20 for aligning the device 12 and the transmitter 18S. The security system 10 may include a transmitter 18 and/or a wireless communication device 43 that comprises a transceiver or may be configured to communicate with a third-party transmitter 18. The battery (or batteries) 36 and/or pin(s) 37 may be positioned along the one or more side surfaces 34, the first end 22, second end 24, interior surface 26 and/or exterior surface 28. Further, the battery (or batteries) 36 and/or pin(s) 37 may be positioned proximal the magnet(s) 32.

The computing module 40 can be electrically connected to the pins 37. As shown schematically in FIG. 1B and described above, the computing module 40 may include one or more processors 106 and/or memory 110 for storing and/or analyzing the sensed conditions or the received data, and/or communicating with the one or more remote computing devices 14A, 14B, 14C, and/or a transmitter 18. For example, the accelerometer 48 may sense conditions, such as accelerations, which may be stored within the memory 44 and analyzed by software and logic of the processor 42 to determine if such accelerations indicate a traumatic force or simply a playful gesture. The processor 42 may also be configured with software to transmit sensed conditions or analytics from the monitoring device 12. The monitoring device 12 may transmit the sensed conditions or analytics through the pins 37 electrically, or through a wireless transmitter to a wireless receiver or may contain an internal subscriber identity module or subscriber identification module (SIM) 69 for further processing or storage by a third party or by the security system 10 using one or more remote computing devices 14A, 14B, 14C and/or transmitters. The SIM 69 may also include one or more processors and/or a memory and/or a transmitter. The sensed conditions or analytics may be processed to perform analytics and/or develop metrics and statistics to enable predictive insights.

Figure 18:
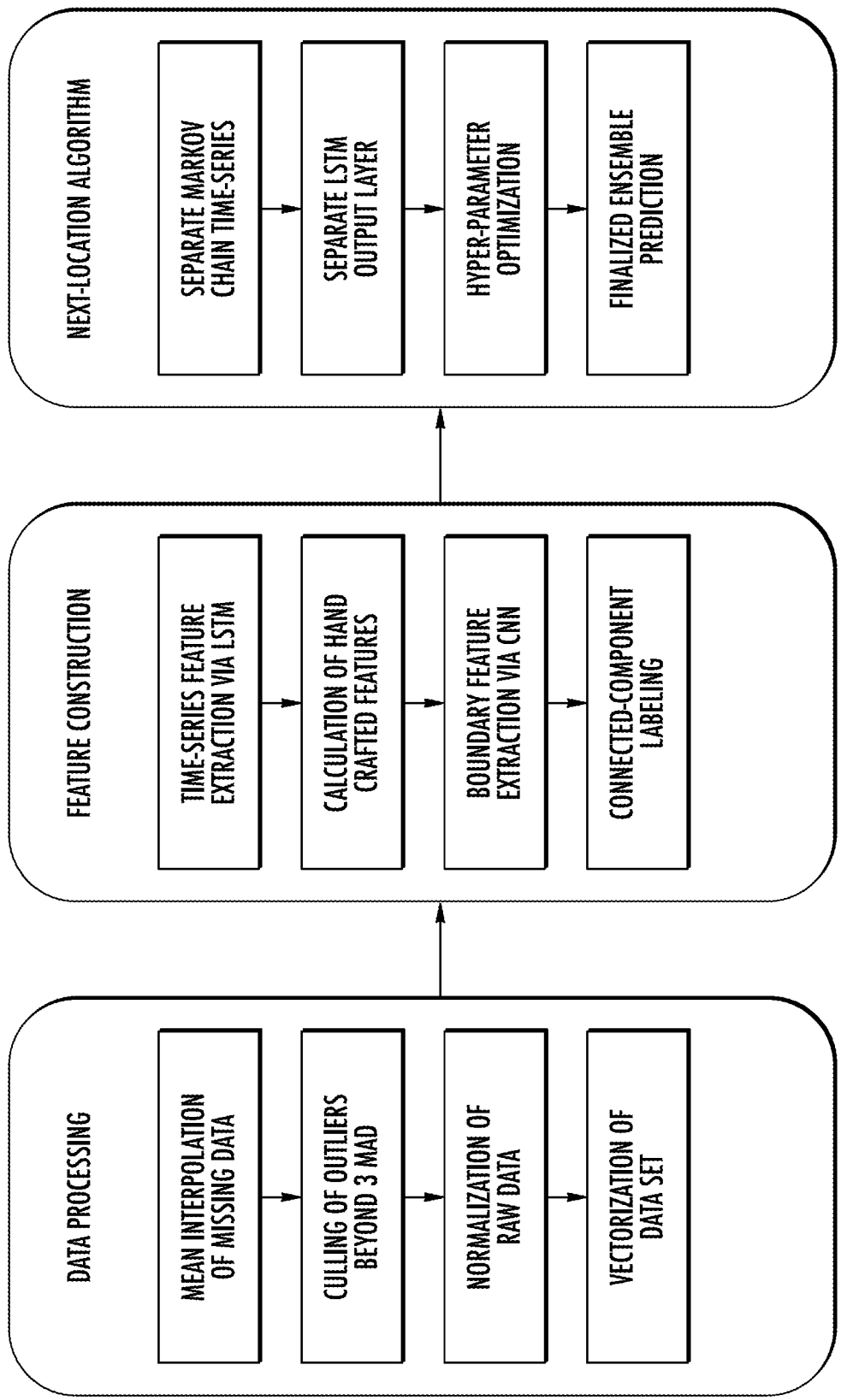
FIG. 18 is a flow diagram of analytics process according to one or more embodiments of the presently disclosed subject matter.

FIG. 18 is a flow diagram of analytics process according to one or more embodiments of the presently disclosed subject matter. In some embodiments, the analytics process can include data processing including, but not limited to identifying and interpolating missing data collected, culling outlier data from the data collected, normalize raw data, and vectorize a data set. Additionally, in some embodiments, the analytics process can provide certain feature constructions such as a time series feature extraction using artificial intelligence such as neural networks like long-short term memory (LSTM) networks to calculate specific features used in the specific monitoring analysis and system. For example, in some embodiments, the analytics process can include extracting boundary features using one or more convolutional neural networks (CNN) architecture. In some embodiments, the analytics process can include using connected component labeling to analyze and assign value to the data collected. Further, in some embodiments, the analytics process can include next location predictions and/or algorithms. The analytics process can include the use of Markov models to predict time-series chains and these chains can be separated. The analytics process can separate LSTM output layer and can use hyperparameter optimization to aid machine learning. The analytics process can use the data and information analyzed and the analytical results to finalize an ensemble prediction of the behavior of the wearer of the monitoring device or of what might happen next.

The security system 10 may include any number of wireless communication setups to enable wireless transmission between a device 12 and/or the charger 90 or some other charging device or system and one or more remote computing devices 14A, 14B, 14C and/or transmitters 18, such as one included in the charging system. The transmissions may be encrypted using any number of cryptographic or other encryption techniques, including but not limited to frequency hopping, time shifting, rotating key encryption and/or other private/public key encryption methods. For example, some encryption methods may only prevent decryption for very short periods of time, but such time may be longer than is needed for the transmissions to be acted upon, and therefore the encryption is effective to prevent an abuser team from reacting to such transmissions in real-time. Some embodiments can include transmission mechanism that employ wireless induction between a transmitter 18B external to the device 12 and a coil 39B within the monitoring device 12 as depicted in FIG. 10.

As disclosed in brief above, and as depicted in FIGS. 4-9 and 13-15, the device 12 may include the main body 20 and the band 50, which can comprise different embodiments. In the embodiment shown in FIGS. 4-9, the band 50 may be coupled to the main body 20 and extend from the first end 22 to the second end 24 for substantially creating a loop. A void 59 may be defined by the band 50 and the interior surface 26 of the main body 20 for accepting the appendage of a user 1 therethrough as shown in FIG. 1A. In some embodiments, the device 12 may be worn about a wrist or arm, while in other embodiments the device 12 may be worn about an ankle or leg. The main body 20 and the band 50 may be coupled together using any number of fasteners. In one embodiment, a first bar 66A may extend through the band 50 for coupling to the first end 22 of the main body 20 and a second bar 66B may extend through the band 50 for coupling to the second end 24 of the main body 20. The bars 66A, 66B may be unitarily constructed as part of the ends 22, 24 or may be fastened thereto.

The band 50 may also house one or more tamper-avoidance cables 56 embedded therein and extending a length of the band 50, from first end 22 to second end 24. The cable 56 may be a tensile-strength cable and/or fiber optic cable. In some embodiments, the tamper avoidance cable can comprise one or more unitary cables that extend from the first end 22 of the main body 20 to the second end 24 of the main body 20 as discussed further below. In the embodiment shown in FIGS. 4-9, the cable 56 may be in communication with the computing module 40 of the main body 20 and may be in communication with an emitter 67 for emitting a signal through the cable 56. The module 40 may further be in communication with a detector 68 for sensing signals that may have been emitted through the cable 56. In some embodiments, the emitter 67 may be periodically pulsed, and the detector 68 may be periodically sampled. The sampled signal may be compared to a reference signal. When the band 50 is bent or broken, the amount of signal that may be received by the detector 68 is attenuated and the sampled signal drops below the reference signal, thus indicating a potential tampering of the device 12. The emitter 67 and/or detector 68 may be housed within the main body 20.

Figure 4:
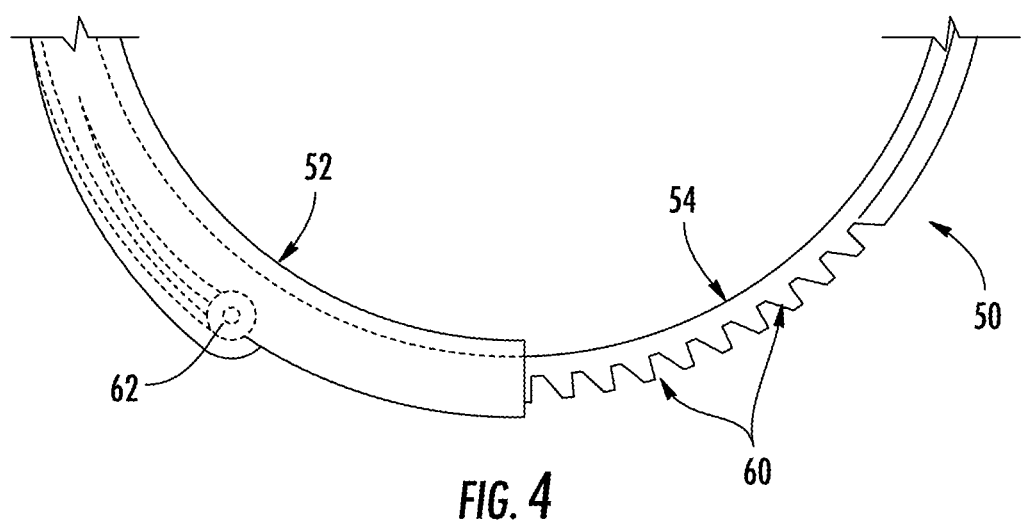
FIG. 4 illustrates a side view of a male portion defining a plurality of teeth engaged with a female portion of a band of a monitoring device according to one or more embodiments of the presently disclosed subject matter.

The band 50 may include a female portion 52 and a male portion 54. The female portion 52 may have both a width and height greater than a width and height of the male portion 54 and may further define a cavity 52A for accepting the male portion 54 therein. With such a configuration, the male portion 54 may be translated within the female portion 52 for engaging a locking mechanism between the two portions 52, 54 for preventing the male portion 54 from being disengaged from the female portion 52 by the user 1, without specialized tools. In some embodiments, the male portion 54 defines a plurality of teeth 60 and the female portion 52 includes one or more clasps 62 for engaging at least one of the plurality of teeth 60 of the male portion 54, as is depicted in FIGS. 4, 5 and 6.

Figure 5:
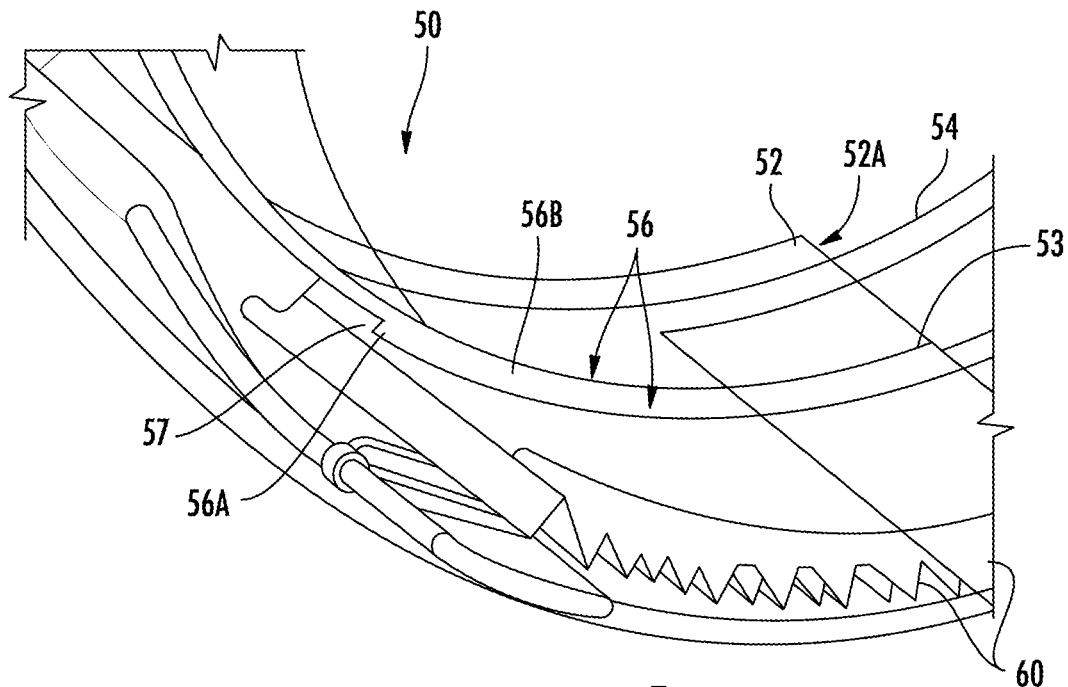
FIG. 5 illustrates a perspective view of a monitoring device including two cables according to one or more embodiments of the presently disclosed subject matter.
Figure 6:
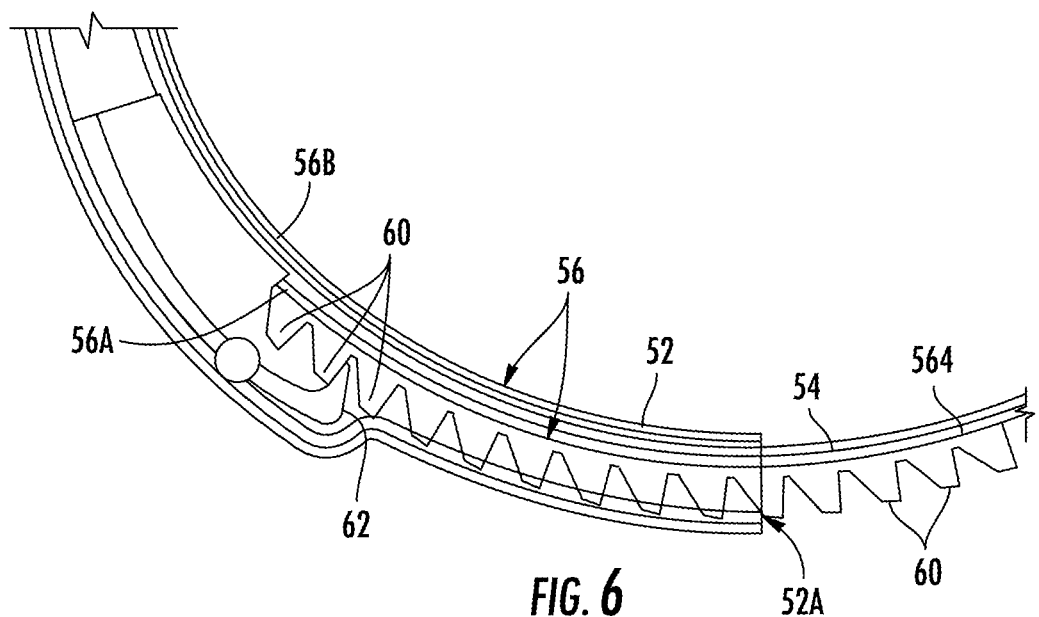
FIG. 6 illustrates a side view of a monitoring device including two cables according to one or more embodiments of the presently disclosed subject matter.

According to some embodiments, as depicted in FIGS. 5 and 6, the tamper-avoidance cable 56 may be coupled with the main body 20 having a first cable 56A and a second cable 56B extend to the first or second end 22, 24. The cable 56A can extend through the male portion 54, and extend from the male portion 54 a distance (this final portion of the cable 56 being the free end 57). When translating the male portion 54 within the female portion 52, the free end 57 of the tamper avoidance cable 56A may slide along a groove 53 defined within the female 52, eventually extending from an end of the female portion 52 proximal the main body 20 and be aligned with and in communication with the cable 56B within female portion 52. The free end 57 may then be clipped so at to extend adjacent or proximal to the main body 20.

Figure 8:
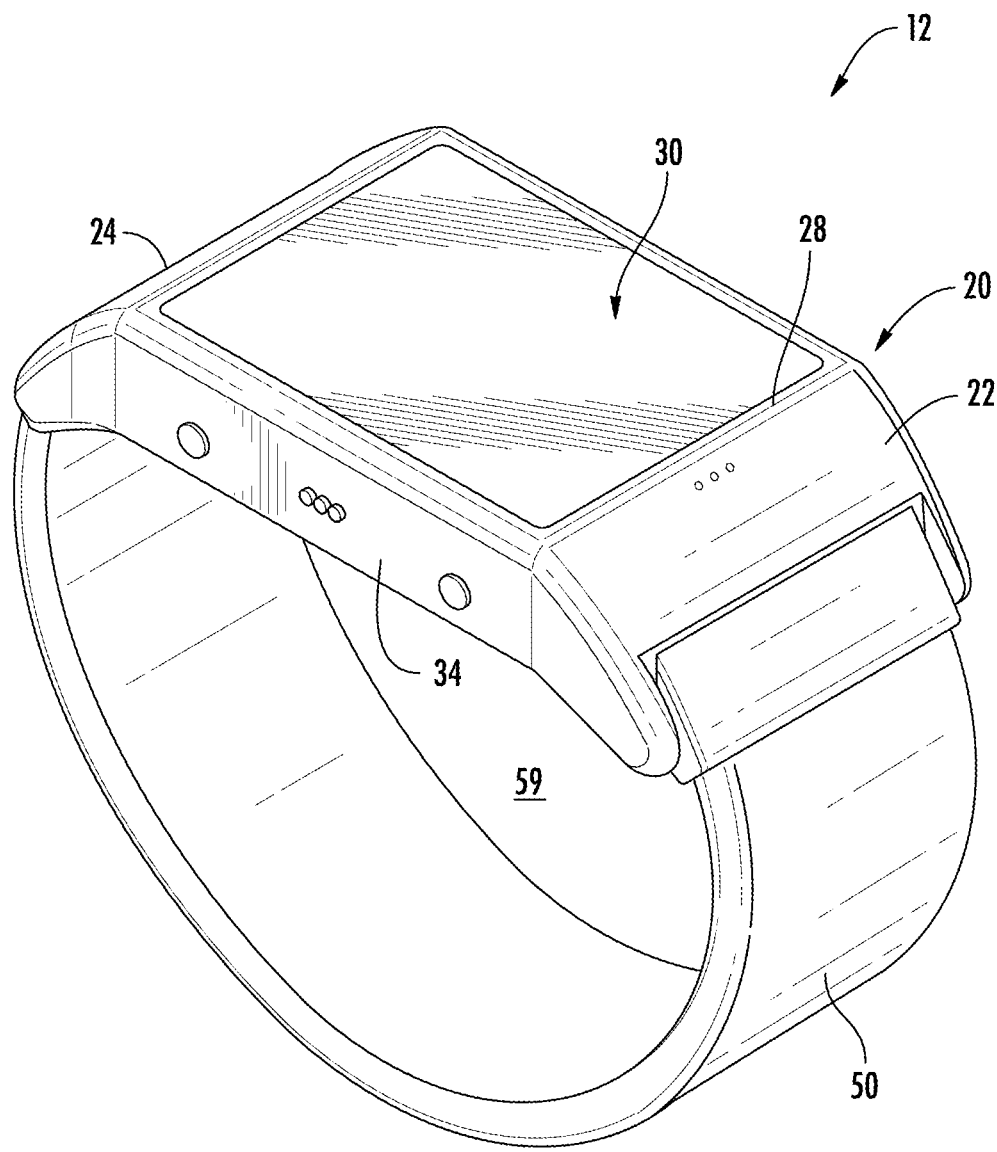
FIG. 8 illustrates a perspective view of a monitoring device according to one or more embodiments of the presently disclosed subject matter.

In FIGS. 6 and 7, two tamper-avoidance cables 56 are depicted, a first cable 56B extending along the female portion 52 and overlapping with the second cable 56A extending along the male portion 54. The ends of the first cable 56A and the second cable 56B can reside in a coupler 56C within the portion of the female portion 54 of the band 50 where the male portion 52 of the band 50 is received. The coupler can facilitate the transfer of a signal between the first and second cables 56A and 56B. The couple can enclose the ends of the first and second cables 56A and 56B on the sides to increase the efficiency of the signal transfer. In this manner, the entire male and female portions 52, 54 are covered in length by the tamper-avoidance cables 56. FIG. 8 offers a holistic view of one embodiment of a monitoring device 12.

In some embodiments, as seen in FIG. 7, a security cable 58 may also be included within the band 50 of the device 12. The security cable 58 may extend from the main body 20, or from the bar 66A, along the entire length of the male portion 54 and into the female portion 52 when the male and female portions 52, 54 are joined. The security cable 58 can have an end 51 that extends proximate to the the oppose side of the main body. The security cable can be used prevent or discourage the cutting or unauthorized forcible removal of the monitoring device 12.

Figure 9:
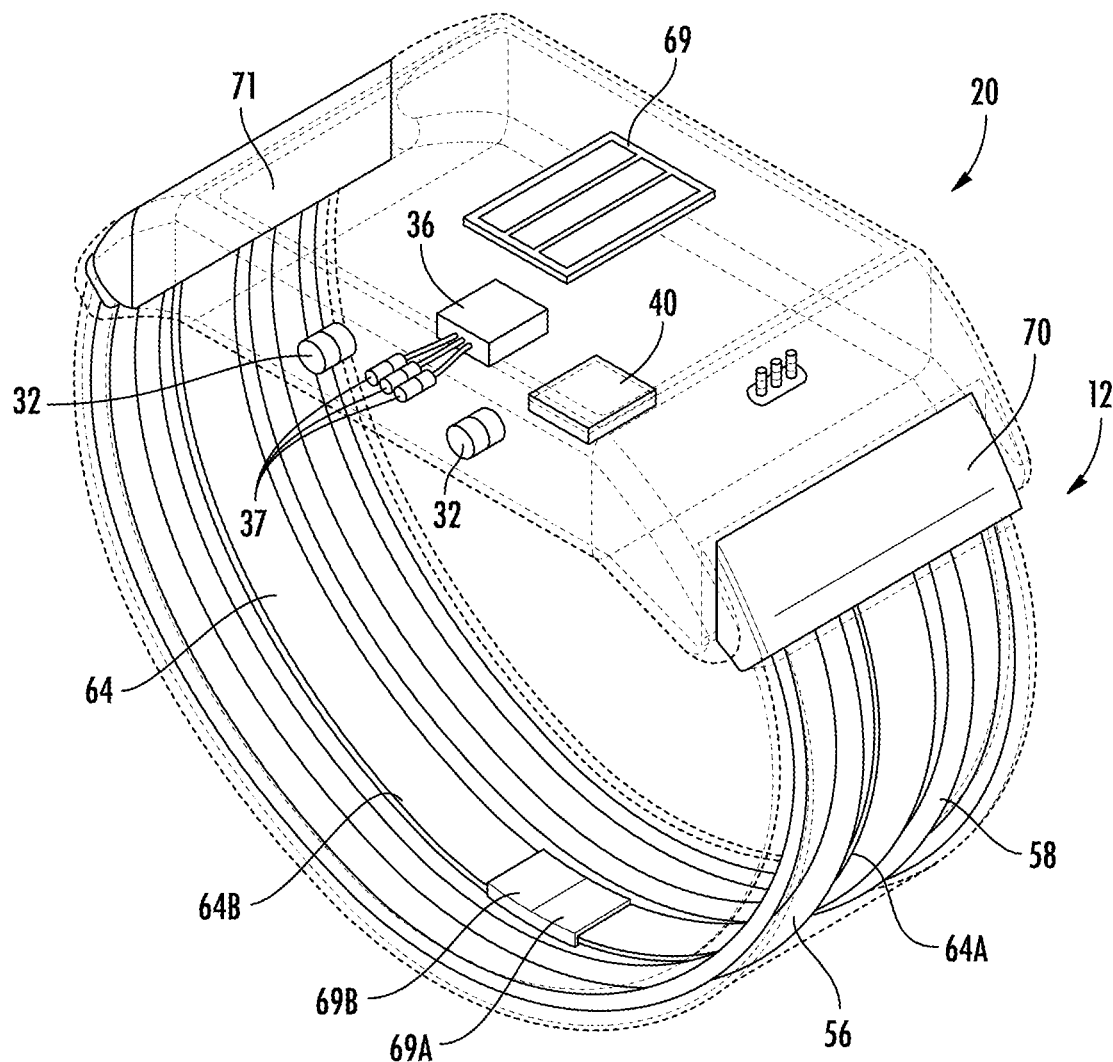
FIG. 9 illustrates a perspective view of a portion of an interior schematic of a monitoring device according to one or more embodiments of the presently disclosed subject matter.

In some embodiments, a metallic strip 64 may be embedded within the band 50 along its entire length. For example, as depicted in FIGS. 9 and 11, the strip 64 may extend through the entire length of band 50. In other embodiments, the strip 64 may extend through the entire length of the male portion 54 and the female portion 52 and each of these male and female sections of the strip 64 may contact each other when the male portion 54 is translated within the female portion 52. Further, the strip 64, through the first and second ends 22, 24 of the main body 20, may be in electrical communication with the computer module 40 for detecting any distorting/destructive forces creating electrical interference or damage along the strip 64. The contact between the male portion 54 and the female portion 52 for the strip 64 may be two metal contacts that slide in frictional contact against each other as the male portion 54 is translated within the female portion 52, and further are coupled to the strip 64. In other embodiments, the strip may include a first strip 64A and a second strip 64B that connect to each other.

In some embodiments, the strip 64 is comprised of foil for twist detection, such that the connection between the first strip 64A and second strip 64B is broken if the band 50 is twisted beyond a tolerance. For sizing to the particular user 1, the band 50 may be cut to size on each of its ends, coupled to the first connection 69A and second connection 69B, then these connections 69A, 69B may be coupled to the first end 22 and second end 24.

The security system 10 may collect and process data, including sensed conditions and analytics. Location data has become ubiquitous with the advent of modern geo-location technology used in cellphones and navigation systems in vehicles. Through the use of machine learning algorithms, predictable patterns in movement can be developed to understand where a mobile user or vehicle is likely to go next based on their current location and previous location history, such as predicting where a user 1 (or wearer of the device 12) is going and would likely go next based on their previous behavior.

Location data may be collected from the device 12, including but not limited to: GPS coordinates, router and network information such as subnet, IP, gateway, MAC address, connected devices, WFPS, and Bluetooth beacons. Additional demographic data and contextual data may be compiled through third party sources (such as from public record and third-party data services), or may be manually entered, such as: name, age, criminal record, places of business, restaurants, parks, attractions, neighborhoods and more. These data may be stored in both a relational and time-series structure in order to build a history of behavior for users 1.

Relative location calculations may be performed by the security system 10 for determining when a wearable device 12 is within a certain distance of a particular victim or third party by also utilizing the victim or third party's locational information. If the monitoring device 12 is used on a user who is a domestic violence offender, for example, then the user's actually location from a tagged location to which the user is not to travel, such as a victim's residence, can be monitored. If the user/offender gets too close the tagged location, the one or more remote computing devices 14A, 14B, 14C can notify the victim, law enforcement agencies, and/or other monitoring entities. The device 12 may also include or be in communication with one or more remote computing devices 14A, 14B, 14C which sense biofeedback signals, such as pulse temperature, and other biofeedback signals, in order to identify fear, anxiety, stress, pain or pathological conditions such as seizures.

Similarly, if used to track the safety of a child, the same or similar data can be used to determine if the child is further away from a tagged location where the child is supposed to reside. If the child ends up too far from the tagged location, then the one or more remote computing devices 14A, 14B, 14C can notify the parents and/or other monitoring entities. The device 12 may also track the child's biofeedback signals, such as pulse temperature, and other biofeedback signals, in order to identify fear, anxiety, stress, pain or pathological conditions.

Referring back to FIG. 18, data may be used in both an aggregate structure to understand the behavior of general users 1 and at an individual level to understand the behavior of a specific user 1. Data may be cleaned, missing data will be interpolated, masked, or otherwise statistically accounted for. Outliers, corrupted data, and other interference may be either masked, removed, or statistically moderated. For the general-purpose algorithm, data may be standardized and normalized across users 1 to account for outliers and variance in the data. Data for individual user 1 models may have additional user specific pre-processing, based on the variance and statistical distribution of the user's specific data.

After data has been processed, valuable features in the data may be extracted that may be used to predict next location. Machine learning techniques including but not limited to convolutional neural networks and long short-term memory neural networks may be used. A combination of Markov chain time-series methods and a deep neural network approach to predict the next location of users may be used. The Markov chain approach typically excels in environments when data is sparse or limited (e.g., early in commercialization). The deep learning, neural network approach typically excels once data is rich and available (e.g., later in commercialization).

The delivery of the predicted output and the current location of users 1 in the security system 10 will be given via an intelligent display dashboard to government officials and law enforcement. They will be able to view forecasted paths of users 1, potential intersections that could cause conflicts, and set alerts for intersections and locations, both current and forecasted that would be of interest/issue. One embodiment of the system's data analysis is schematically represented in FIG. 18.

As shown in FIG. 13-17B, other embodiments of a wearable monitoring device 112 are provided. The wearable monitoring device 112 can comprise a main body 120 defining a first body end 122 opposite a second body end 124. The main body 120 can have an interior surface 126 opposite an exterior surface 128 and both extending between the first body end 122 and the second body end 124. The wearable monitoring device 112 can also comprise a display 130 positioned at the exterior surface 128. Similarly, the monitoring device can house many of the same features described above with reference to FIGS. 1A-12 including, but not limited to a computing module 140 housed within the main body 120, wherein the computing module includes a memory 110 and one or more processors 106 as well as communication interfaces 108, such as wireless communication devices, as described above. Further, the wearable monitoring device 112 can comprise a band 150 having a band body 152 having a first band end 152A and a second band end 152B. The band 150 can be configured to extend from the first body end 122 to the second body end 124 so that the band 150 and the main body 120 define a void 159 between the interior surface 126 and the band 150. The band 150 can also comprise a securement cable 154 within the band body 152. The securement cable 154 can comprise a first cable end 154A secured to the first body end 122 and a second cable end 154B having an engagement portion 156.

Figure 14:
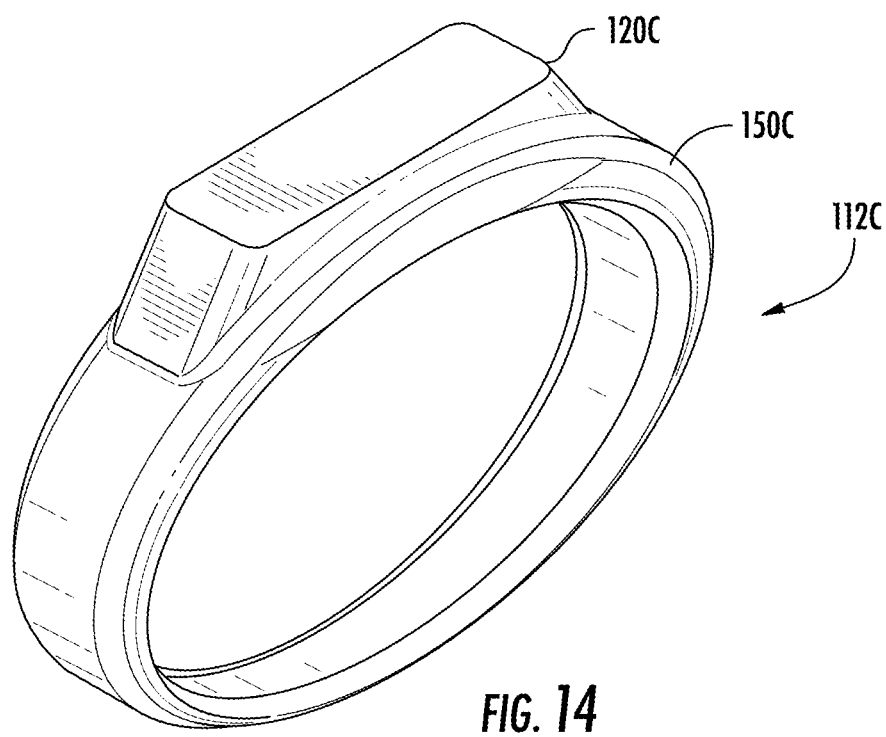
FIG. 14 illustrates a perspective view of a monitoring device sized for a child according to one or more embodiments of the presently disclosed subject matter.
Figure 17A:
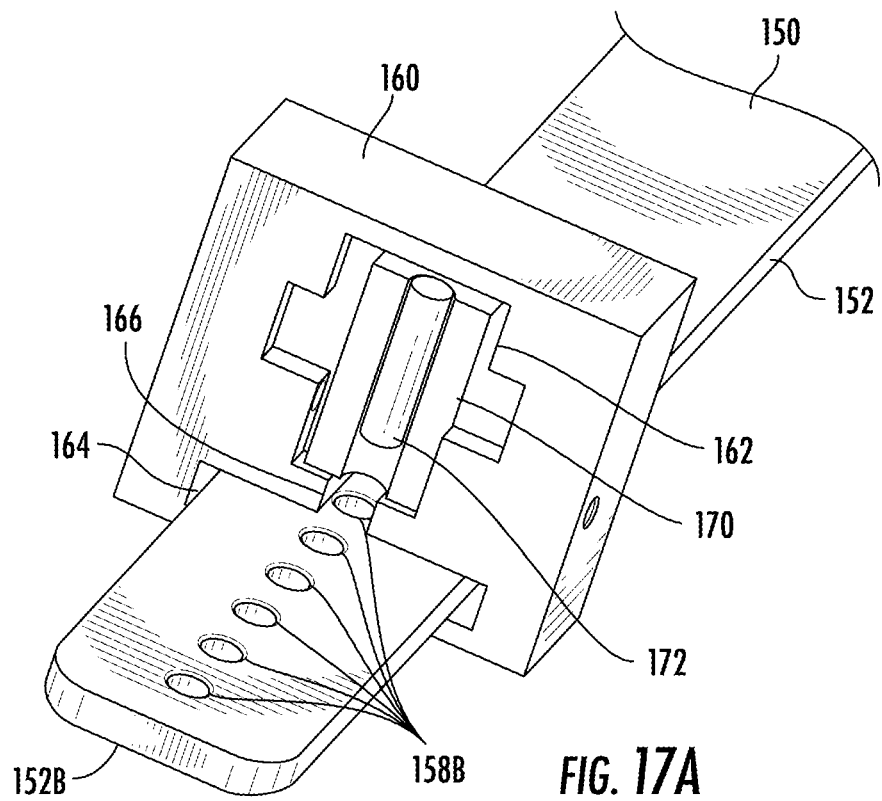
FIGS. 17A and 17B illustrate perspective views of an embodiment of a latching bock with a solenoid respectively engaging and disengaging a band of a monitoring device according to one or more embodiments of the invention.
Figure 17B:
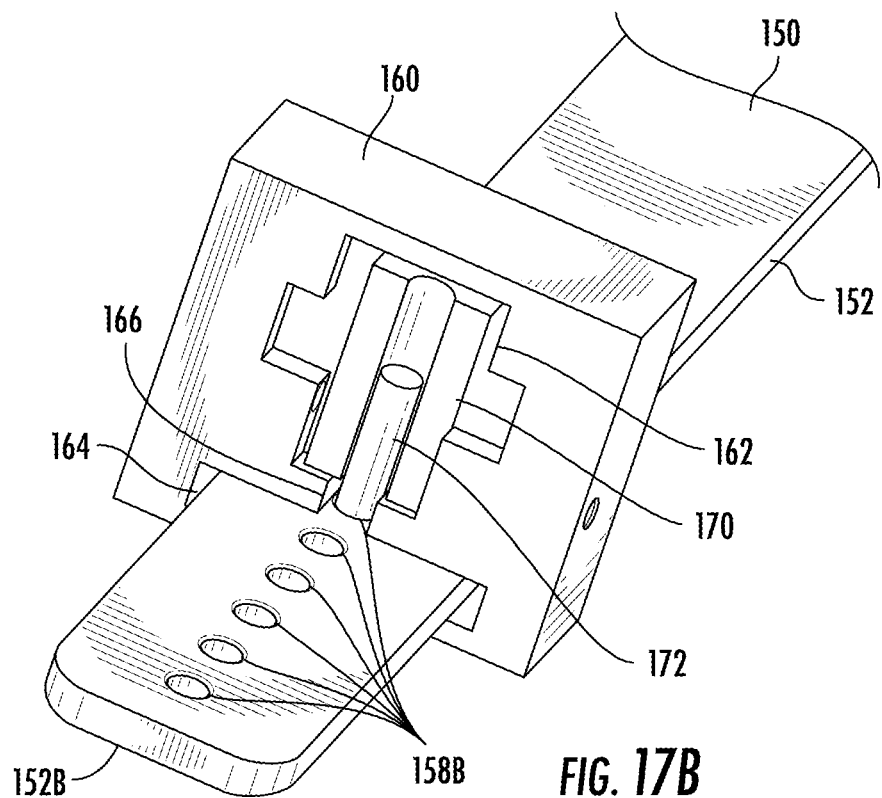

Further, a wearable monitoring device 112 can comprise a solenoid 170 within the main body 120 for engaging the engagement portion of the securement cable 154 to hold the second body end 152B of the band 150 to the main body 120. The solenoid 170 can be in operable communication with the computing module 140 to cause the solenoid 170 to engage the engagement portion 156 of the securement cable 154 to hold the second band end 152B to the main body 120 and to disengage the engagement portion 156 of the securement cable 154 to release the second band end 152B from the main body 120. In particular, in some embodiments, the solenoid 170 can comprise an extendable and retractable plunger 172 as shown in FIGS. 17A, 17B that can engage the engagement portion 156 of the securement cable 154 of the band 150. As shown in FIG. 14, a smaller version of a wearable monitoring device 112C that can be used with children can be provided. The child monitoring device 112C can be adjustable with a second band end of the band 150 having a plurality of locking apertures therein for receiving the plunger 172 of the solenoid 170 as shown in FIGS. 17A and 17B within the main body 120C.

Figure 15:
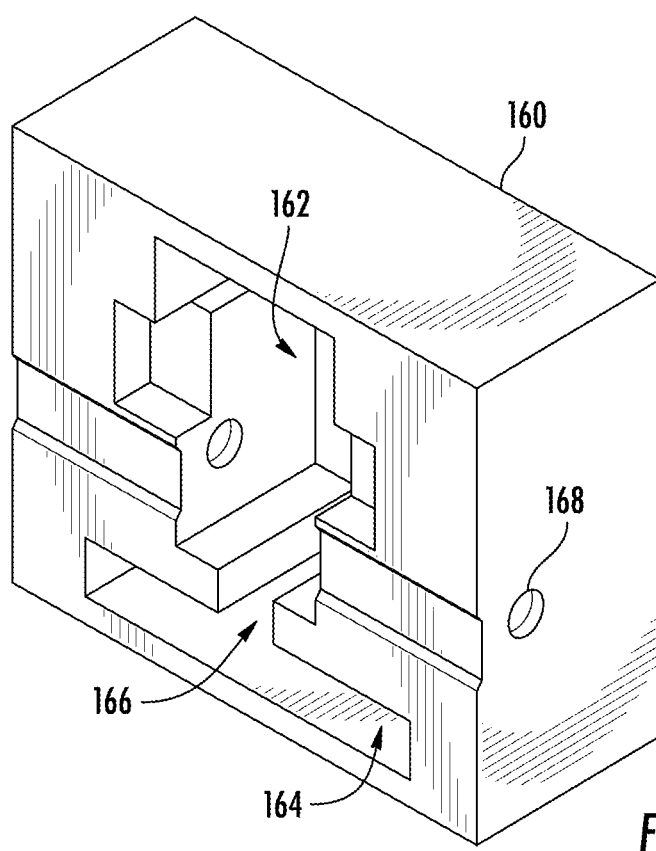
FIG. 15 illustrates a perspective view of an embodiment of a latching block of a monitoring device sized according to one or more embodiments of the presently disclosed subject matter.
Figure 16:
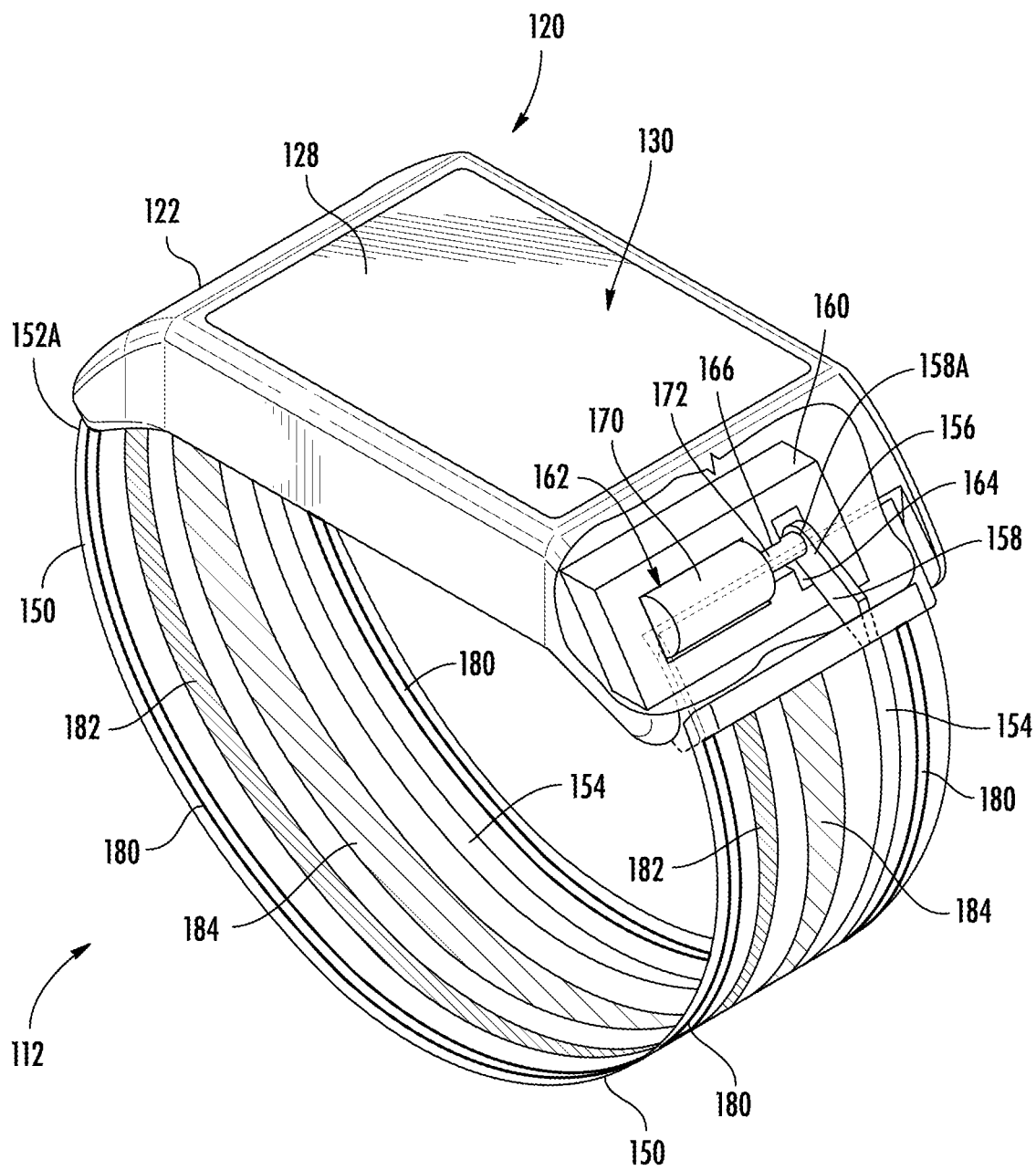
FIG. 16 illustrates a perspective view of another version of a monitoring device and a band of the monitoring device according to one or more embodiments of the presently disclosed subject matter.

In some embodiments, the wearable monitoring device 112 can further comprise a latching block 160 as shown in FIGS. 15 and 16 within the main body 12 in which the solenoid 170 resides. The latching block 160 can have a solenoid compartment 162 configured to house the solenoid 170. The latching block 160 can also have a band compartment 164 for receiving at least a portion of the second band end 152B including the engagement portion 156 of the securement cable 154. Additionally, the latching block 160 can have a plunger passage way 166 that extends between the solenoid compartment 162 and the band compartment 164. The plunger passage way 166 allows the plunger 172 of the solenoid 170 to extend therethrough to engage the engagement portion 156 of the securement cable 154 of the band 150 to secure the second end 152B of the band 150 to the main body 120 of the monitoring device 112. Conversely, the plunger passage way 166 allows the plunger 172 of the solenoid 170 to retract to disengage the engagement portion 156 of the securement cable 150 of the band to release the second end 152B of the band 150 from the main body 120 of the monitoring device 112. The latching block 166 can include screw holes 168 for securement of the latching block 160 into the monitoring device 112.

In some embodiments, the latching block 160 can be positioned in the second body end 124 of the main body 120 of the monitoring device as shown in FIG. 16. The latching box 160 can have various orientations within the main body 120. The orientation of the latching box 160 can depend on the planned orientation of the solenoid 170 and the configurations of the band 150, the securement cable 154, and the engagement portion 156 of the securement cable 154.

In some embodiments, the engagement portion 156 of the securement cable 154 comprises an insert clasp 158 that can extend outward from the second band end 152B. The insert clasp 158 can have a clasp aperture 158A therein. The insert clasp 158 can be configured for insertion into the band receiving compartment 164 of the latching block 160 in the second body end 124 of the main body 120 such that the clasp aperture 158A is positioned to receive a plunger 172 of the solenoid 170 to lock the second band end 152B of the band 150 to the second body end 124 of the main body 120. In some embodiments, as shown in FIGS. 17A and 17B, the engagement portion 156 of the securement cable 154 can comprise a plurality of clasp apertures 158B to permit the band 150 to be adjustable about a wrist of a wearer. As discussed above, such an adjustable band may be useful for embodiments of the monitoring device 112 to be used with children. In some embodiments, he monitoring device 12 can include a receptacle for receiving the end 152B.

Figure 13:
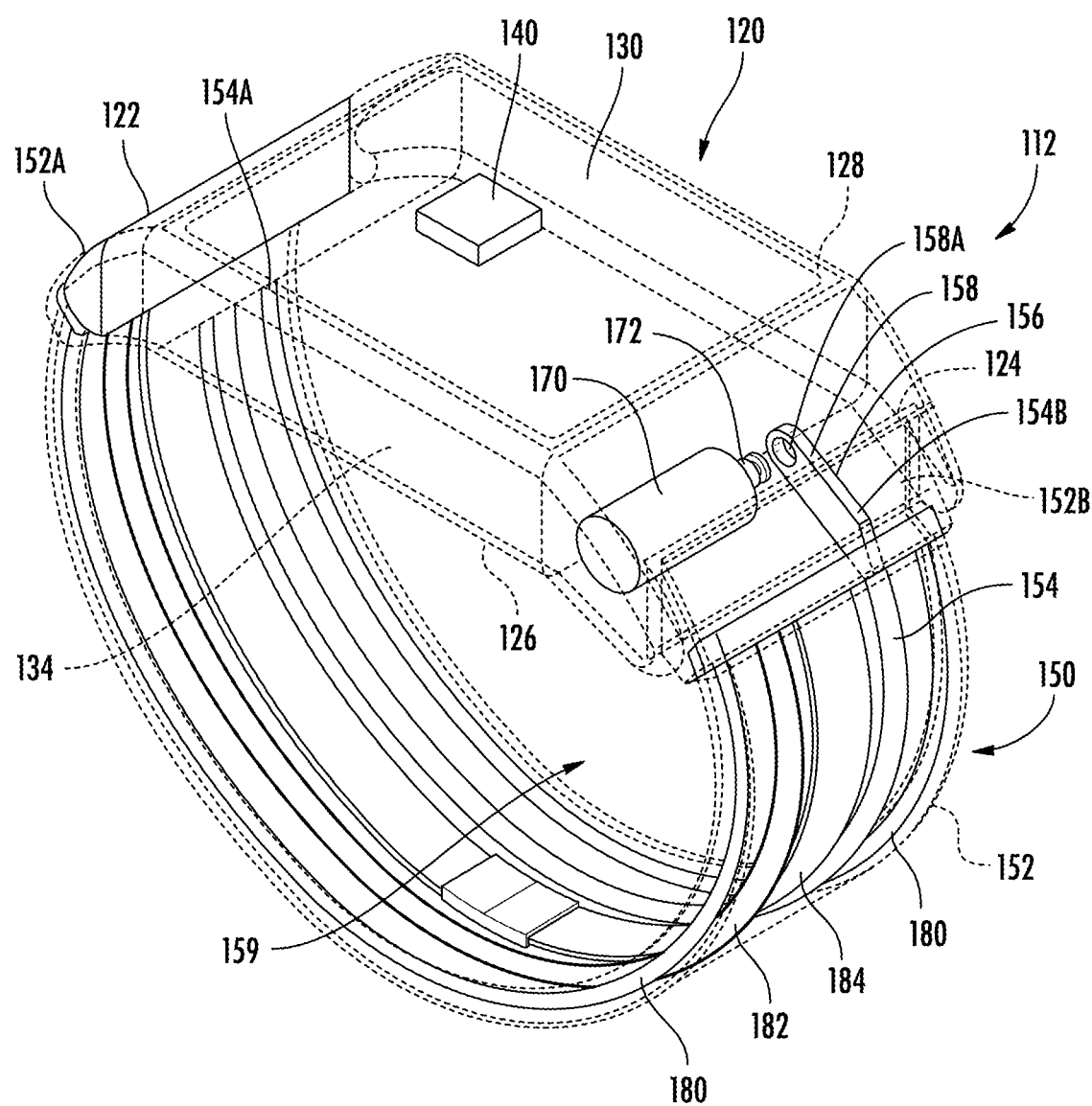
FIG. 13 illustrates a perspective view of a portion of an interior schematic of a monitoring device and a band of the monitoring device according to one or more embodiments of the presently disclosed subject matter.

In addition to the securement cable 154, the monitoring device 112 can have other mechanisms to help keep the band 150 in a closed state to hold the monitoring device 112 to the user or help detect if someone tries to remove the monitoring device 112 from the user. For example, in some embodiments, the monitoring device 112 can comprise at least one of a tensile-strength cut detection metal circuit strip 180 to detect if the band 150 in which the cut detection strip 180 is placed is trying to be removed by cutting or slicing the band 150 of the monitoring device 112. For example, the band 150 can have two cut detection metal circuit strips 180 on either side of the band 150 as shown in FIGS. 13 and 16. If one of the cut detection metal circuit strips 180 is severed, then a signal can be sent to the processor 106 which can then send a message to one or more remote computing devices 14A, 14B, 14C of a monitoring entity to notify the monitoring entity that the someone is trying to remove the monitoring device 112. In some embodiments, the band 150 of the monitoring device 112 can also comprise a fiber optic cable 182 therein that, if broken or cut, can send a signal to the processor 106 which can then send a message to one or more remote computing devices 14A, 14B, 14C of a monitoring entity to notify the monitoring entity that the someone is trying to remove the monitoring device 112. Similarly, in some embodiments, the band 150 of the monitoring device 112 can also include a twist detection metal circuit strip 184 within the band body 152 and can extend from the first band end 152A to the second band end 152B of the band 150. As above, the twist detection metal circuit strip 184 can be a foil for twist detection, such that an electrical connection between can be broken if the band 150 is twisted beyond a tolerance.

To help monitor what the user is doing or what may be happening to the user, the monitoring device can include a variety of different monitoring and measurement mechanisms. For example, in some embodiments, the monitoring device can comprise an accelerometer housed within the main body and in communication with the one or more processors. In some embodiments, the monitoring device can comprise a microphone housed within the main body and in communication with the one or more processors. Further, in some embodiments, the monitoring device can include a global positioning system (GPS) device housed within the main body and in communication with the one or more processors.

Thus, as provided above, a system for monitoring activity of a person is provided. The system comprises one or more remote computing devices for receiving monitoring information and a wearable monitoring device in wireless communication with the one or more remote computing devices. The monitoring device can be configured to be worn by a user. The monitoring device can comprise a main body defining a first body end opposite a second body end. Additionally, the main body can have an interior surface opposite an exterior surface with both extending between the first end and the second end with a display positioned at the exterior surface of the main body, so that the display is viewable by the wearer/user. The monitoring device can also comprise a computing module housed within the main body. The computing module can comprise a memory and one or more processors. The memory can store instructions that when executed by the one or more processors of the monitoring device cause the system to perform operations. The monitoring device can also comprise an accelerometer housed within the main body and in communication with the one or more processors and a microphone housed within the main body housed within the main body and in communication with the one or more processors. Additionally, the monitoring device can comprise a global positioning system (GPS) device housed within the main body and in communication with the one or more processors. Further, as above, the monitoring device can comprise a band having a band body having a first band end and a second band end. The band can be configured to extend from the first body end to the second body end for defining a void between the interior surface and the band that when placed on a user/wearer is occupied by the user's wrist.

The instructions stored on the memory and executed by the one or more processors of the monitoring device cause the system to perform operations that can include determining a location of the monitoring device on a wrist of a wearer using the GPS device and reporting the location of the monitoring device being worn by a wearer to one or more remote computing devices to provide notification of the location of the wearer. Additionally, in some embodiments, the operations can include identifying a tagged location and determining the distance between the wearer of the monitoring device and the tagged location based on the location of the monitoring device. The one or more processors can then report the distance between the user/wearer of the monitoring device and the tagged location to the one or more remote computing devices. Additionally, the operations can include reporting to a notification computing device if the wearer of the monitoring device is too close or too far from the tagged location based on the reported distance between the wearer of the monitoring device and the tagged location. In some embodiments where the monitoring device further comprises at least one of a tensile-strength cut detection metal circuit strip, a fiber optic cable or a twist detection metal circuit strip within the band body that can extend from the first band end to the second band end of the band and are in communication with the one or more processors, a number of additional operations are available. For example, in some embodiments, the operations of the system can include determining if the twist detection metal circuit strip has been deformed and reporting a deformation in the twist detection metal circuit strip to the one or more remote computing devices. In some embodiments, the operations of the system can further comprise determining if the fiber optic cable has been broken and reporting a break of the fiber optic cable to the one or more remote computing devices. Additionally, the operations of the system can further comprise determining if the tensile-strength cut detection metal circuit strip has been cut and reporting a cut of the tensile-strength cut detection metal circuit strip to the one or more remote computing devices.

Similarly, the present disclosure provides a method for monitoring activity of a person. The method can comprise placing a monitoring device as described in detail above on a wrist of a wearer. The monitoring device can be in wireless communication with one or more remote computing devices. The method can comprise determining a location of the monitoring device on a wrist of a wearer using the GPS device and reporting the location of the monitoring device being worn by a wearer to one or more remote computing devices to provide notification of the location of the wearer. Additionally, the method of monitoring can comprise identifying a tagged location and determining the distance between the wearer of the monitoring device and the tagged location based on the location of the monitoring device. Once the distance between the wearer of the monitoring device and the tagged location is determined, the monitoring device can report the distance between the wearer of the monitoring device and the tagged location to the one or more remote computing devices. Depending on how the monitoring system is intended to be used, if the distance is too close or too far from the tagged location based on the reported distance between the wearer of the monitoring device and the tagged location, then the remote computing device(s) can report to a notification computing device such as a law enforcement agency or a computing device owned by a parent or victim as a warning system.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

The invention claimed is:

1. A wearable monitoring device comprising:
   a main body defining a first body end opposite a second body end, an interior surface opposite an exterior surface and both extending between the first end and the second end;
   a display positioned at the exterior surface;
   a computing module housed within the main body, wherein the computing module includes a memory and one or more processors;
   a band having a band body having a first band end and a second band end, the band configured to extend from the first body end to the second body end for defining a void between the interior surface and the band, the band comprising a securement cable within the band body, the securement cable comprising a first cable end secured to the first body end and a second cable end having an engagement portion; and
   a solenoid within the main body for engaging the engagement portion of the securement cable to hold the second body end of the band to the main body, the solenoid in operable communication with the computing module to cause the solenoid to engage the engagement portion of the securement cable to hold the second band end to the main body and to disengage the engagement portion of the securement cable to release the second band end from the main body.

2. The monitoring device according to claim 1, further comprising a latching block within the main body in which the solenoid resides, the latching block having a solenoid compartment configured to house the solenoid, a band compartment for receiving at least a portion of the second band end including the engagement portion of the securement cable.

3. The monitoring device of claim 2, wherein the latching block is positioned in the second body end of the monitoring device.

4. The monitoring device of claim 3, wherein the engagement portion of the securement cable comprises an insert clasp that extends outward from the second band end, the insert clasp having a clasp aperture therein and configured for insertion into the band receiving compartment of the latching block in the second body end of the main body such that the clasp aperture is positioned to receive a plunger of the solenoid to lock the second band end of the band to the second body end of the main body.

5. The monitoring device of claim 3, wherein the engagement portion of the securement cable comprises a plurality of clasp apertures to permit the band to be adjustable about a wrist of a wearer.

6. The monitoring device of claim 1, further comprising at least one of a tensile-strength cut detection metal circuit strip, a fiber optic cable or a twist detection metal circuit strip within the band body and extending from the first band end to the second band end of the band.

7. The monitoring device of claim 1, further comprising an accelerometer housed within the main body and in communication with the one or more processors.

8. The monitoring device of claim 1, further comprising a microphone housed within the main body housed within the main body and in communication with the one or more processors.

9. The monitoring device of claim 1, further comprising a global positioning system (GPS) device housed within the main body and in communication with the one or more processors.

10. The monitoring device of claim 1, wherein the device is in wireless communication with one or more remote computing devices.

11. A system for monitoring activity of a person, the system comprising:
one or more remote computing devices for receiving monitoring information;
a wearable monitoring device in wireless communication with the one or more remote computing devices and configured to be worn by a wearer, the monitoring device comprising:
a main body defining a first body end opposite a second body end, an interior surface opposite an exterior surface and both extending between the first end and the second end;
a display positioned at the exterior surface;
a computing module housed within the main body, wherein the computing module includes a memory and one or more processors;
an accelerometer housed within the main body and in communication with the one or more processors;
a microphone housed within the main body housed within the main body and in communication with the one or more processors;
a global positioning system (GPS) device housed within the main body and in communication with the one or more processors; and
a band having a band body having a first band end and a second band end, the band configured to extend from the first body end to the second body end for defining a void between the interior surface and the band;
the memory storing instructions that when executed by the one or more processors of the monitoring device cause the system to perform operations comprising:
determining a location of the monitoring device on a wrist of a wearer using the GPS device;
reporting the location of the monitoring device being worn by a wearer to one or more remote computing devices to provide notification of the location of the wearer.

12. The system according to claim 11, wherein the operations further comprise:
identifying a tagged location;
determining the distance between the wearer of the monitoring device and the tagged location based on the location of the monitoring device; and
reporting the distance between the wearer of the monitoring device and the tagged location to the one or more remote computing devices.

13. The system according to claim 12, wherein the operations further comprise:
reporting to a notification computing device if the wearer of the monitoring device is too close or too far from the tagged location based on the reported distance between the wearer of the monitoring device and the tagged location.

14. The system according to claim 11, wherein the monitoring device further comprises a securement cable within the band body, the securement cable comprising a first cable end secured to the first body end and a second cable end having an engagement portion; and
a solenoid within the main body for engaging the engagement portion of the securement cable to hold the second body end of the band to the main body, the solenoid in operable communication with the computing module to cause the solenoid to engage the engagement portion of the securement cable to hold the second band end to the main body and to disengage the engagement portion of the securement cable to release the second band end from the main body.

15. The system according to claim 14, wherein the monitoring device further comprises a tensile-strength cut detection metal circuit strip, a fiber optic cable or a twist detection metal circuit strip within the band body and extending from the first band end to the second band end of the band that are in communication with the one or more processors.

16. The system according to claim 15, wherein the operations further comprise:
determining if the twist detection metal circuit strip has been deformed; and
reporting a deformation in the twist detection metal circuit strip to the one or more remote computing devices.

17. The system according to claim 15, wherein the operations further comprise:
determining if the fiber optic cable has been broken; and
reporting a break of the fiber optic cable to the one or more remote computing devices.

18. The system according to claim 15, wherein the operations further comprise:
determining if the tensile-strength cut detection metal circuit strip has been cut; and
reporting a cut of the tensile-strength cut detection metal circuit strip to the one or more remote computing devices.

19. A method for monitoring activity of a person, the method comprising:
placing a monitoring device in wireless communication with one or more remote computing devices on a wrist of a wearer, the monitoring device comprising:
a main body defining a first body end opposite a second body end, an interior surface opposite an exterior surface and both extending between the first end and the second end;
a display positioned at the exterior surface;
a computing module housed within the main body, wherein the computing module includes a memory and one or more processors;
an accelerometer housed within the main body and in communication with the one or more processors;
a microphone housed within the main body housed within the main body and in communication with the one or more processors;
a global positioning system (GPS) device housed within the main body and in communication with the one or more processors; and
a band having a band body having a first band end and a second band end, the band configured to extend from the first body end to the second body end for defining a void between the interior surface and the band;
determining a location of the monitoring device on a wrist of a wearer using the GPS device;
reporting the location of the monitoring device being worn by a wearer to one or more remote computing devices to provide notification of the location of the wearer.

20. The method according to claim 19, further comprise:
identifying a tagged location;
determining the distance between the wearer of the monitoring device and the tagged location based on the location of the monitoring device; and reporting the distance between the wearer of the monitoring device and the tagged location to the one or more remote computing devices.

21. The method according to claim 20, further comprise:
reporting to a notification computing device if the wearer of the monitoring device is too close or too far from the tagged location based on the reported distance between the wearer of the monitoring device and the tagged location.

\* \* \* \* \*